US011014297B2

(12) United States Patent
Robert

(10) Patent No.: US 11,014,297 B2
(45) Date of Patent: May 25, 2021

(54) PRINTING ASSEMBLY FOR THREE-DIMENSIONAL PROTOTYPING

(71) Applicant: Jared Robert, Lehi, UT (US)

(72) Inventor: Jared Robert, Lehi, UT (US)

(*) Notice: Subject to any disclaimer, the term of this patent is extended or adjusted under 35 U.S.C. 154(b) by 208 days.

(21) Appl. No.: 15/894,772

(22) Filed: Feb. 12, 2018

(65) Prior Publication Data
US 2018/0236713 A1    Aug. 23, 2018

Related U.S. Application Data

(60) Provisional application No. 62/457,875, filed on Feb. 11, 2017, provisional application No. 62/529,463, filed on Jul. 6, 2017.

(51) Int. Cl.

| B29C 64/20 | (2017.01) |
|---|---|
| B29C 64/209 | (2017.01) |
| B29C 64/255 | (2017.01) |
| B29C 64/232 | (2017.01) |
| B29C 64/236 | (2017.01) |
| B29C 64/245 | (2017.01) |
| B29C 64/321 | (2017.01) |
| B29C 64/295 | (2017.01) |
| B29C 64/118 | (2017.01) |
| B33Y 30/00 | (2015.01) |
| B33Y 40/00 | (2020.01) |
| B29C 64/364 | (2017.01) |
| B29C 64/393 | (2017.01) |
| B29K 67/00 | (2006.01) |

(52) U.S. Cl.
CPC .......... *B29C 64/209* (2017.08); *B29C 64/118* (2017.08); *B29C 64/232* (2017.08); *B29C 64/236* (2017.08); *B29C 64/245* (2017.08); *B29C 64/255* (2017.08); *B29C 64/295* (2017.08); *B29C 64/321* (2017.08); *B29C 64/364* (2017.08); *B29C 64/393* (2017.08); *B33Y 30/00* (2014.12); *B33Y 40/00* (2014.12); *B29K 2067/046* (2013.01)

(58) Field of Classification Search
CPC ... B29C 64/209; B29C 64/393; B29C 64/255; B29C 64/232; B29C 64/236; B29C 64/245; B29C 64/321; B29C 64/295; B29C 64/118; B29C 64/364; B33Y 30/00; B33Y 40/00
See application file for complete search history.

(56) References Cited

U.S. PATENT DOCUMENTS

| 5,656,230 A | 8/1997 | Khoshevis | |
|---|---|---|---|
| 10,611,138 B2* | 4/2020 | Miller | B33Y 30/00 |
| 2003/0151167 A1 | 8/2003 | Kritchman et al. | |
| 2006/0054039 A1 | 3/2006 | Kritchman et al. | |
| 2016/0067920 A1* | 3/2016 | Fontaine | B29C 64/106 264/255 |
| 2016/0279853 A1* | 9/2016 | Bracha | B29C 64/118 |
| 2017/0157826 A1* | 6/2017 | Hishiki | B29C 48/2888 |

* cited by examiner

*Primary Examiner* — Joseph S Del Sole
*Assistant Examiner* — Jamel M Nelson
(74) *Attorney, Agent, or Firm* — Amy Fiene PC; James Sonntag

(57) ABSTRACT

A printer that forms a three-dimensional object includes a single arm with all 3 axes on the head to move spatially while a substrate underneath the head remains fixed. Improved design and components enhance 3D movement, access to components, performance, durability, and ease of service.

4 Claims, 39 Drawing Sheets

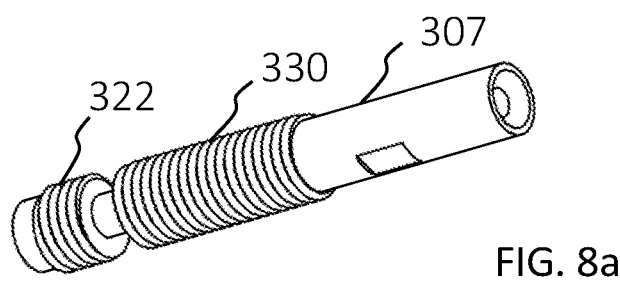
FIG. 8a
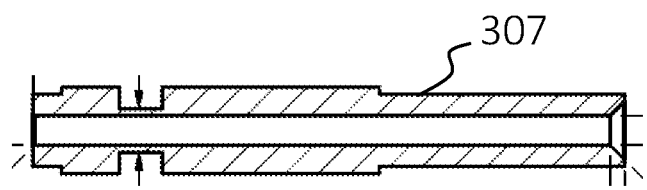
FIG. 8b
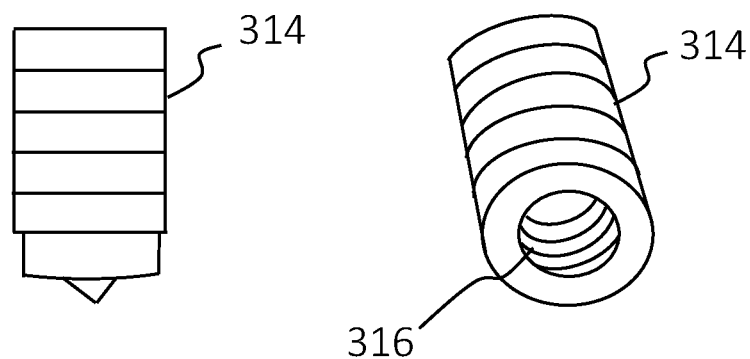
FIG. 9a
FIG. 9b

SECTION A-A

PRINTING ASSEMBLY FOR THREE-DIMENSIONAL PROTOTYPING

BACKGROUND

The following relates to techniques for rapid prototyping of a three-dimensional (3D) object based on a computer model of the object. Particularly, a printer is used to fabricate a prototype from a plurality of two-dimensional layers that make up a digital representation of a 3D object. Computer software is used to section the representation of the 3D object into a plurality of two-dimensional layers. A printer then fabricates a layer of modeling material for each layer sectioned by the software. Together, the various fabricated layers form the desired prototype.

Various known types of printers are used to print a 3D part from a digital representation in a layer-by-layer manner by extruding a flowable part material. Some printers use a print head that moves in an XY plane to deposit modeling material as a sequence of roads on a substrate. Depositing the modeling material is done through an extrusion tip carried by the print head. Upon release, the extruded modeling material fuses to previously deposited modeling material and solidifies upon a drop in temperature. The position of the substrate is then incremented along a Z axis (perpendicular to the XY plane of the head), and the process is then repeated to form a 3D part replica of the digital representation.

Another printer setup uses a print head that moves in an XZ plane while the substrate slides in a Y axis. One reason this setup is problematic is because the modeling material moves in the Y axis before the material is fully solidified. The flyweight of the material caused by the movement of the material along the Y axis can cause defects in the prototype which remain permanent once the prototype has fully solidified. Other types of printer setups are also known in the art and have various problems associated with them.

Another common problem with movement of the substrate is that the modeling material does not always match up properly with each overlay. In other words, the movement of the substrate causes the material of the prototype to be out of alignment. When the material is not fully solidified, this can contribute to tilting of the prototype.

In general, movement of the substrate does not always maintain an optimal, horizontal position of the substrate. Even a small tilt of the substrate relative to the horizontal plane causes formation of the prototype to be uneven. Most substrates have four points of support, which can cause the substrate to bend even when not moving, further making it difficult and time-consuming to keep the substrate in a level, horizontal position.

Even without issues of moving the substrate or supporting the substrate, an uneven surface can occur. For example, the substrate may warp on its own or a surface coating may be used to cover the substrate that causes warping.

Other issues with 3D printing techniques include, for example, that the modeling material used by the printer does not always provide uniform density in objects. Also, handling can be problematic, for example, the extrusion tip, or hot end, may be difficult to change out of the printer. In short, many problems exist which require time-consuming efforts, burdensome handling, and which result in an overall poor quality end product, thus creating an urgent need for better 3D printing.

SUMMARY

An exemplary printer that forms a three-dimensional object includes a print head that moves spatially in all XYZ directions to release printing materials in layers onto a fixed substrate. The 3D printer comprises a frame with an arm slidably attached to a proximal end of the frame such that the arm slides in a X direction and a Z direction relative to the frame. The frame may include a horizontal railing slidably attached to the frame in a Z direction relative to the frame. The arm is located above the substrate, and extends horizontally and parallel to the substrate. The arm is slidably attached at one end to the horizontal railing in a X direction relative to the horizontal railing. The print head is slidably attached to the arm along the Y direction. Movement of the print head and arm together provide three-dimensional spatial movement. An extruder at the bottom of the print head is configured to release a heated printing material from the print head onto the fixed substrate in layers to form a prototype.

An exemplary hot end configuration comprises a heat sink, a nozzle, and a barrel having a first threaded portion that is removably attached to the heat sink and a second threaded portion that is removably attached to the nozzle. A heater block having an opening with a smooth interior wall is configured to slide around the nozzle and be secured to the nozzle by locking structure so that the nozzle and the heat sink can be removed from the heater block as an independent assembly.

A system for printing a three-dimensional object comprises a three-dimensional printer with a user-accessible containment that is attached to the three-dimensional printer. A hollow within the containment is configured to house at least one filament, at least one vent in the containment, and at least one heat component that provides controlled heat throughout the containment.

A computer-implemented method for printing a three-dimensional object includes providing a substrate that is fixed to a frame. A horizontal arm slidably attached to the frame moves in a X direction and a Z direction relative to the frame, and a print head slidably attached to the horizontal arm moves in an Y direction relative to the horizontal arm. Computer-implemented access directs three-dimensional movement of the print head and control of the release of the heated printing material. The printer receives instructions relative to two-dimensional slices of a desired three-dimensional object and based on the instructions, the printer moves the arm in one or more spatial X or Z directions relative to a frame, and moves the print head in a Y direction relative to the horizontal arm. Also, the print head releases heated printed material through an extruder of the print head onto the substrate according to information in the code.

BRIEF DESCRIPTION OF DRAWINGS

FIG. 8a shows a perspective view of a barrel.

FIG. 8b shows a cutout view of a barrel.

FIG. 9a shows a front view of a nozzle.

FIG. 9b shows a perspective view of a nozzle.

DETAILED DESCRIPTION

The following disclosure is intended to provide one or more improvements on existing 3D printing technologies.

An improved printer may form a prototype from a plurality of two-dimensional layers that make up a digital representation of a 3D object. Particularly, the printer may include a single arm and print head attached to the arm, the configuration of the print head and arm providing all 3 axes on the print head to move spatially while a substrate underneath the print head remains fixed. Also, the printer may include improved components that enhance performance and aid in user operability.

An exemplary printer that forms a three-dimensional object includes a print head that moves spatially in all XYZ directions to release printing materials in layers onto a fixed substrate. The printer comprises a frame with an arm with a free end that extends outwardly relative to the frame. The arm is attached by a sliding mechanism to a proximal end of the frame. The print head is slidably attached to the arm. The attachment for which sliding may occur may involve a sliding mechanism. The arm is not to be confused with a gantry system which is supported and/or attached on both ends. The arm is located above the substrate, and extends horizontally and parallel to the substrate. The arm is slidably attached to the frame along an X axis and slidably attached to the frame in a Z axis. The print head slides along the arm in a Y axis. Movement of the print head and arm together provide three-dimensional spatial movement. An extruder at the bottom of the print head is configured to release a heated print material from the print head onto the fixed substrate in layers to form a prototype.

A computer-implemented method for printing a three-dimensional object, includes providing a substrate that is fixed to a frame. A horizontal arm slidably attached to the frame moves in an X direction and a Z direction relative to the frame, and a print head slidably attached to the horizontal arm moves in a Y direction relative to the horizontal arm. The printer receives software instructions relative to two-dimensional slices of a desired three-dimensional object and based on the code, the printer moves the arm in one or more spatial X or Z directions relative to a frame, and moves the print head in a Y direction relative to the horizontal arm. Also, the print head releases heated print material through an extruder of the print head onto the substrate according to information in the software instructions.

Figure 1A:
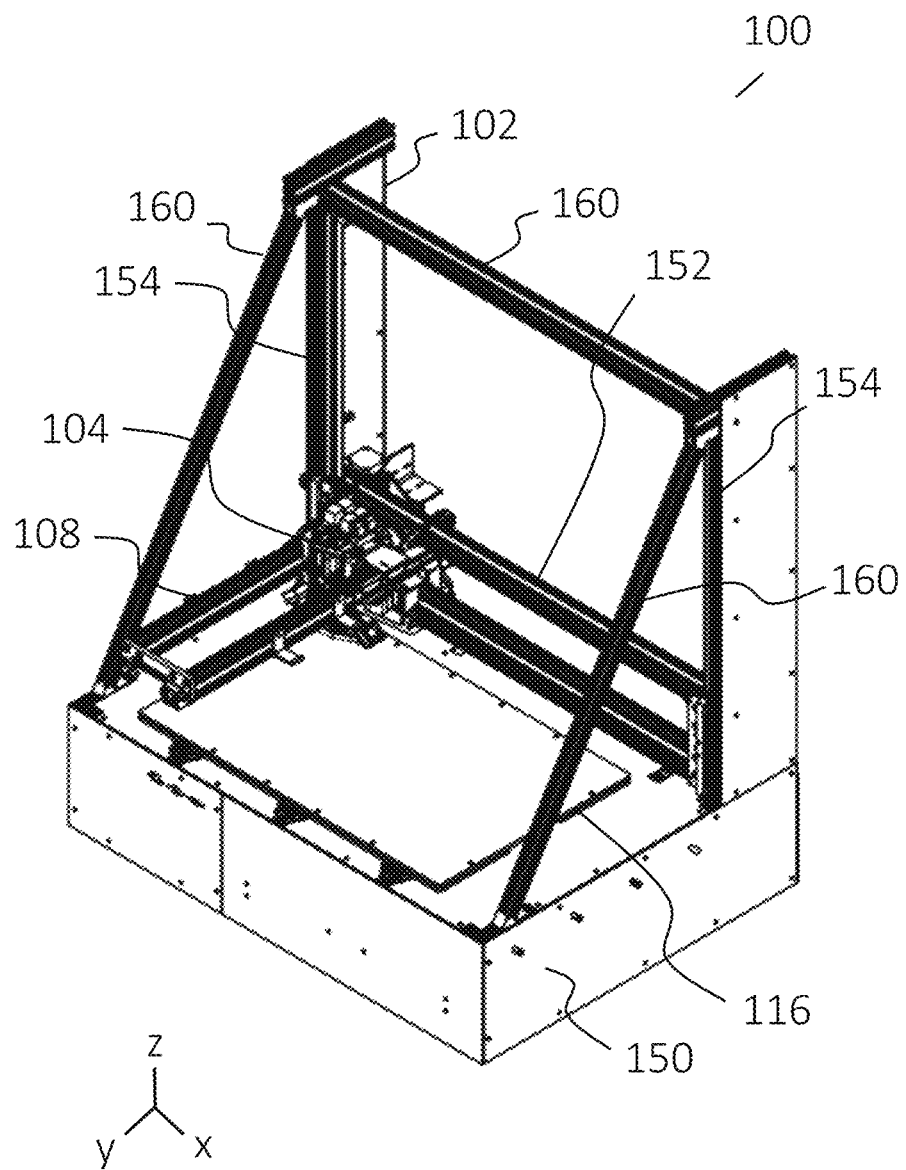
FIG. 1a is a perspective view of a 3D printer.

An exemplary 3D printer 100 as shown in FIG. 1a includes a print head 104 that is capable of moving spatially in the XYZ directions relative to the frame 102. With all 3 axes on the print head 104, the substrate 116 can remain fixed and does not need to move. A single arm 108 having a free end extends from a horizontal railing 152 to achieve better movement, including better accuracy, precision, and speed. A common gantry type system is not required.

The frame includes one or more vertical support members that are configured to support the structure of the printer including its various print elements and the substrate. As shown, an exemplary vertical support member located along the back (at a proximal end) of the frame 102 includes two back vertical members 154 comprising two elongate members located at or near back corners of the frame 102. There may also be a vertical support member, such as two front vertical members, located along the front (at a distal end) of the frame 102, not shown. The back vertical members 154 are configured to support a back support structure (e.g. horizontal railing 152 that extends between the two back vertical members).

The connection of the frame may further include exemplary crossbars 160, elongate members extending front to back and side to side to provide the further stability and a stronghold. Various other structural configurations may be used instead to support the various print elements and retain the substrate so that it remains level. This includes support structures located along one or more of the back, front, sides, within the interior space of the frame, and above or below the frame.

The single arm 108 of the printer is slidably attached to the horizontal railing 152, and the horizontal railing 152 is slidably attached at its ends to the back vertical members 154. In this manner, the single arm 108 is moved along the Z axis and the horizontal railing 152 is moved along the back vertical members 154. As shown, the single arm 108 is positioned a distance apart from the substrate 116 and is slidably engaged or otherwise supported by the frame 102 to move parallel relative to the substrate 116. Exemplary horizontal railing 152 includes an elongate member that extends between back vertical members 154 and is fixed at its ends. Single arm 108 is slidably attached to the horizontal railing 152 at or near one end. The other end of the single arm 108 is freely extended. As the horizontal railing is displaced in the Z direction along the back vertical members, the single arm 108 is displaced with it and thereby achieves movement in the Z direction. The single arm 108 also slidably moves relative to the length of the horizontal railing 152 and thereby achieves movement in the X direction. The single arm 108 extends in the Y direction with the print head 104 slidably engaged to the single arm 108 for movement in the Y direction. With this configuration, the print head 104 achieves movement in all XYZ spatial movement.

The horizontal railing 152 may include a single bar or a plurality of bars of varying or similar thickness that are arranged in a parallel configuration. For example, the back horizontal railing 152 may include two bars that are spaced apart by a width and components of the arm (e.g. carriage assembly, etc.), as discussed below, are slidably attached at ends to each of the bars.

The 3D printer is also direct drive instead of Bowden drive, a known drive in the art that pushes a filament into a print head. Below the fixed substrate 116 is a storage space 150 provided to support one or more filament spools containing filament to be fed to the 3D printer for printing prototypes.

Using a fixed substrate means that the prototype does not move with respect to the frame. This is beneficial because it cuts down on vibrations that would otherwise occur by movement of the substrate. This is also beneficial because the material that forms the prototype takes time to set and should not be moved on a substrate until it has hardened. With the print head having all 3 axes and the substrate being fixed, the center of gravity of the prototype is kept low which is also beneficial.

Figure 1B:
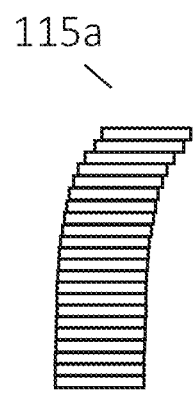
FIG. 1b is a prototype with a tilt.
Figure 1C:
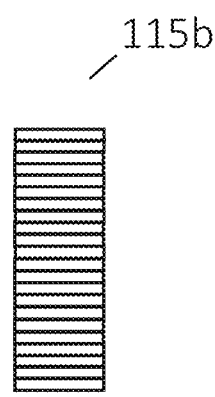
FIG. 1c is a prototype without a tilt.
Figure 1D:
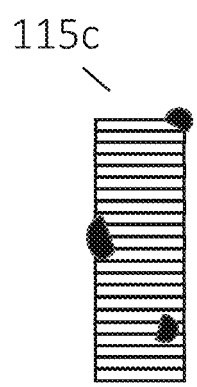
FIG. 1d is a prototype with pimpling.
Figure 1E:
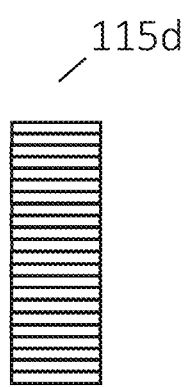
FIG. 1e is a prototype without pimpling.

With convention three-dimensional printers, moving substrates cause problems. FIG. 1b illustrates a tilt in a three-dimensional object or prototype 115a made on a moving substrate (not shown). The tilt is a problem that commonly results when the substrate of a printer moves before the material is fully solidified. It may also be the result of misalignment of the material layers when the substrate of a printer moves. Providing a fixed substrate can correct these types of situations so that three-dimensional objects and especially tall thin objects stay vertically straight. As shown in FIG. 1c, prototype 115b made on a fixed substrate comprises print material that has been layered to form a vertically straight member. In addition to correcting tilt and misalignment issues, other defects such as pimpling or other defects are avoided by having a fixed substrate. FIG. 1d illustrates a prototype 115c in which there is uneven print material distribution that causes pimpling due to a moving substrate as compared to prototype 115d on a fixed substrate in FIG. 1e which results in an even distribution.

Figure 2:
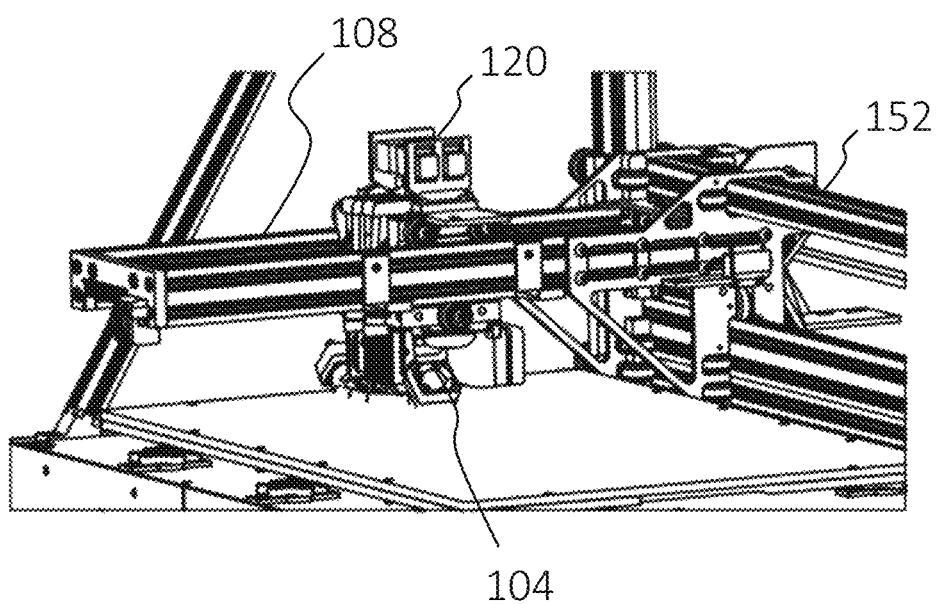
FIG. 2 is a perspective view of the back of the carriage assembly.

FIGS. 2-6 show greater detail of the setup of the system. Turning to FIG. 2, the single arm 108 is shown extending in a generally perpendicular direction outward from the horizontal railing 152. A printerhead carriage assembly 120 that carries the print head 104 is slidably engaged to the horizontal railing 152. In this manner, the print head 104 is conveyed along the Y axis relative to the single arm 108.

Figure 3:
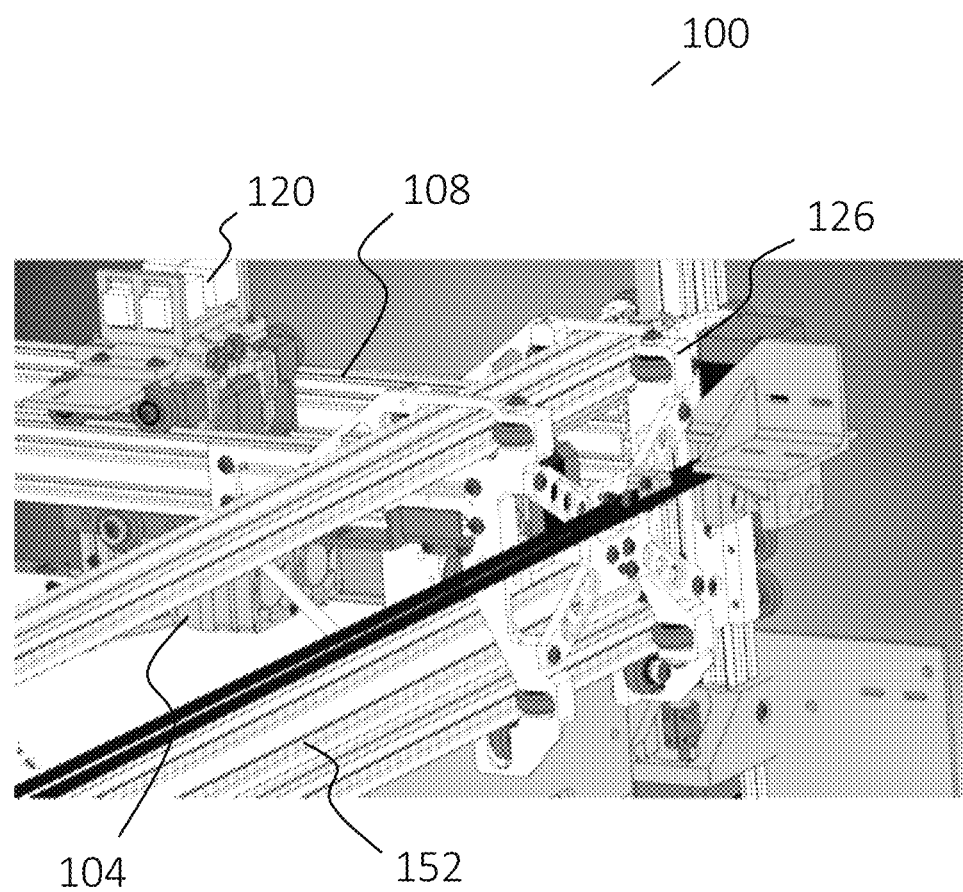
FIG. 3 is a perspective view of the back of the carriage assembly.
Figure 4:
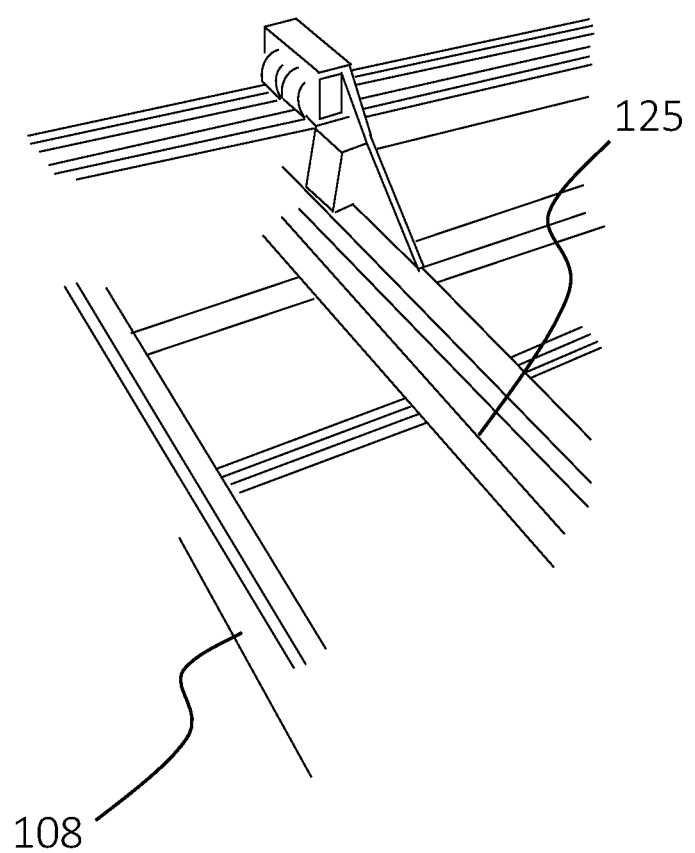
FIG. 4 shows a belt that runs in the Y axis along an interior side of the arm as driven by a motor.
Figure 5:
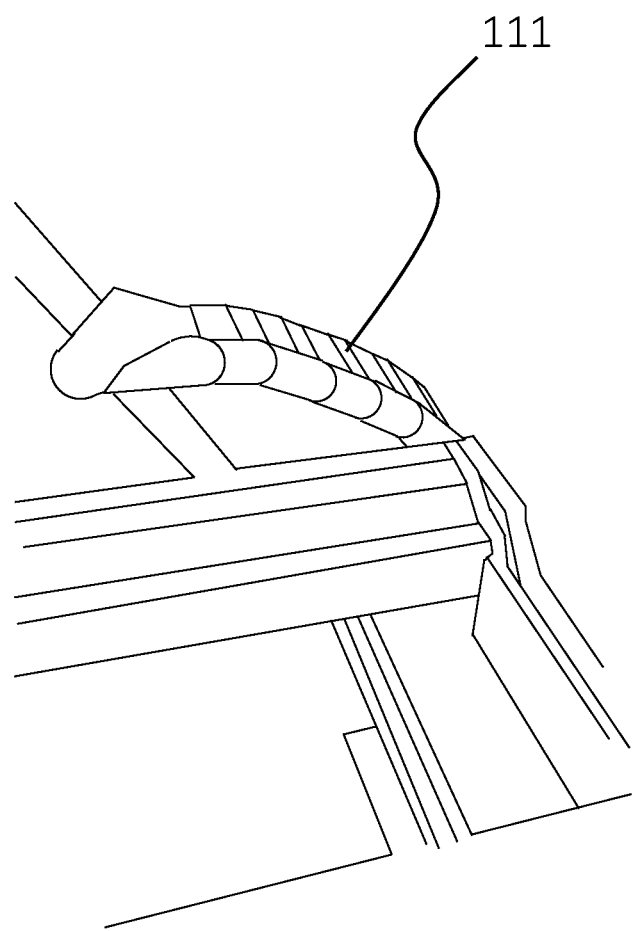
FIG. 5 shows the end of the arm where an idle Y wheel is attached.

FIG. 3 illustrates a perspective view of the back of the printer 100. Clearly shown is the horizontal railing 152 and a housing 126 that is slidably engaged to the horizontal railing 152. The housing 126 includes structure for mounting and supporting the outstretched single arm 108. Structure is provided by the housing 126 to maintain the single arm 108 in a stretched outward position such that the single arm 108 stays parallel with the substrate regardless of the position of a printerhead carriage assembly 120 along the horizontal railing 152. The printerhead carriage assembly 120 includes structure for holding the print head 104 and for slidably engaging the print head 104 to the single arm 108.

Figure 6:
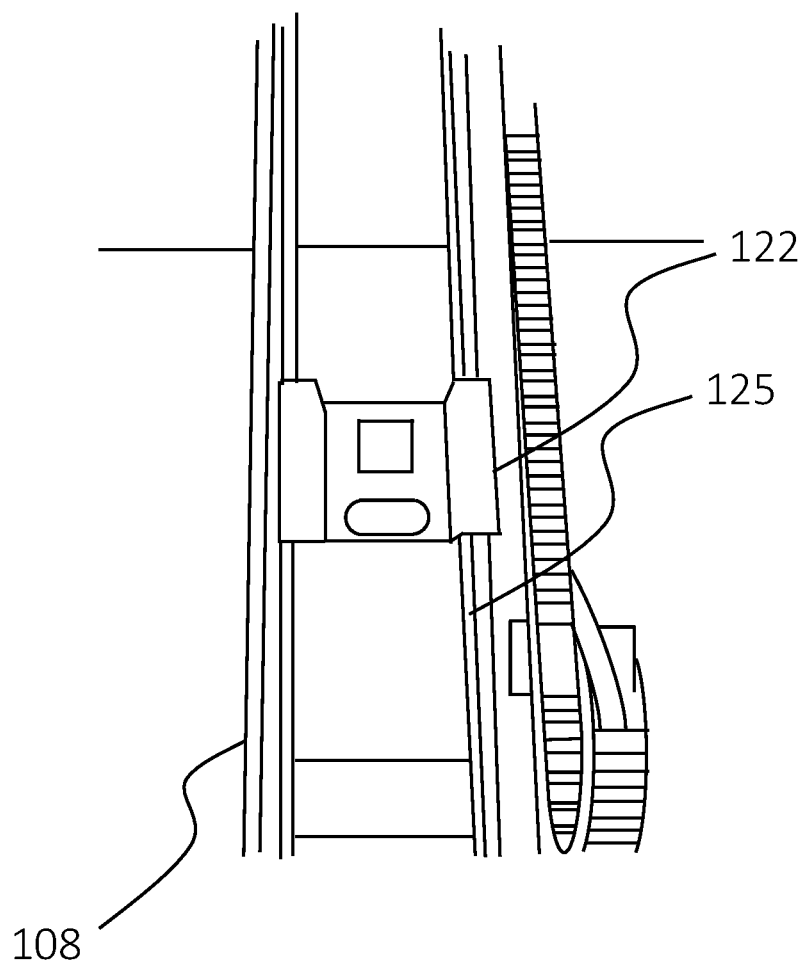
FIG. 6 shows a top view of the arm with the print head partially disassembled.

A belt 125 is connected to the single arm 108 and is used to convey the printerhead carriage assembly 120 along the length of the single arm 108. When being assembled, both sides of the belt 125 are attached to the printerhead carriage assembly 120 by means of a tensioning mechanism, or a tensioning mechanism is attached, to remove slack. In this manner, slack in the belt 125 can be avoided. The belt 125 runs in the Y axis along an interior side of the single arm 108 as driven by a motor. FIG. 6 shows a top view of the single arm 108 with the printerhead carriage 122. The belt 125 can be seen on the interior side of the single arm 108, however it may also be located on the exterior side of the single arm 108 or underneath the single arm 108. Other readily known means of conveyance are known.

One or more motors are responsible for moving the printerhead carriage assembly 120 and the single arm 108. Movement may be carried out with a plurality of motors, for example, a motor for the print head 104 on the Y axis, a motor for the single arm 108 and print head 104 along the X axis, and two motors that control the print head along the Z axis. Fewer or additional motors may be used. The motors may have a constant or variable speed. Alternate means of providing movement as known in the art are also contemplated.

Additionally, systems comprising one or more of belts, cables, pulleys, pinions, racks, gears, driven screws, chains, sprockets, wheels and the like may be used to convey the print head 104 along the single arm 108 and Y axis and to move the single arm 108 and print head 102 along the horizontal railing 152 and X axis.

Unlike many printers which use acrylic frames, the frame herein is made of mostly metal or all metal (e.g. aluminum). The fixed substrate is also made of mostly metal or all metal (e.g. aluminum). Embodiments include a fixed substrate made of other materials, including glass, acrylic, metal or combinations thereof. Such a design allows a larger build space than what is commonly available. For example, a 516 mm×320 mm×468 mm (i.e., 20"×12.6"×18") space may be used. Smaller and larger dimensions are also usable. The design is meant to be a professional precision machine with many adjustable tuning points.

Figure 7B:
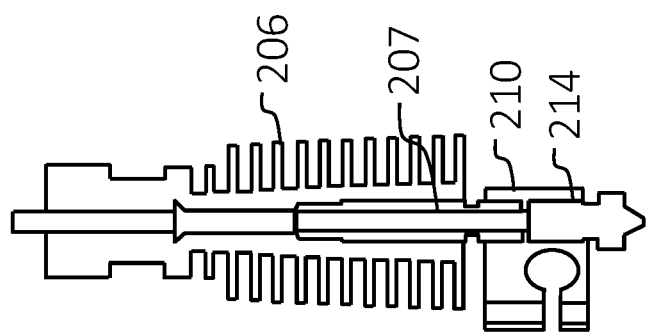
FIG. 7b shows a conventional hot end.
Figure 7A:
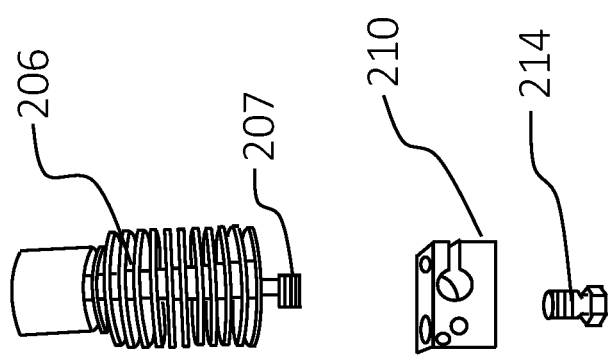
FIG. 7a shows an exploded view of a conventional hot end.

FIG. 7a illustrates an extruded view of components of a conventional hot end including a heat sink 206, heat break 207, heater block 210, and nozzle 214.

The purpose of the heat sink 206 is to cool down the cold side of the heat break 207. As shown, the heat sink 206 typically includes a cylinder with a standard groove-mount for mounting to a printer. The heat sink 206 shown has grooves to increase its surface area and cooling capability. It is also typically cooled with a fan (not shown) attached to its side.

Usually made from aluminum, the heater block 210 joins the nozzle 214 to the heat break 207 and holds a heater cartridge and thermistor, not shown.

The nozzle 214 is an attachment that is configured to allow the filament to come out. It takes in the molten filament (e.g., 1.75 mm, 3 mm, etc.) and is tapered down to form a smaller nozzle size (e.g., 0.4 mm, etc.). These are typically made of brass for its good heat conductivity, but brass is not suitable for printing abrasive materials (such as glow in the dark and metal-filled filaments) so sometimes (hardened) stainless steel is used.

Most hot ends use a ceramic heater cartridge, though some older designs use power resistors or nichrome wire. This component is, as the name suggests, responsible for heating up the hot end. The heat block usually clamps around the heater cartridge to provide good contact.

The heat break 207 is the part where hot meets cold. As shown, it usually takes the form of a thin tube that is connected to the heat sink and is made of stainless steel for its low thermal conductivity. The goal is generally to have the transition be as short as possible so as little of the filament is in a molten state as possible. At least a portion of the heat break 207 extends outward from the base of the heat sink and is configured to connect the heater block 210 to the heat sink 206. For example, the extended portion may include threads or another type of connective means.

One problem with the conventional hot end is a result of the heater block 210 being sandwiched between the heat break 207 and the nozzle 214, as shown in cutout view of hot end in FIG. 7b. The nozzle 214 and heat sink 206 each have threaded ends. When the nozzle 214 is screwed into the heater block 210 and when the heat break 207 is screwed into the heater block 210, the fit between the various components can be a problem. For example, a tight fit will prevent leakage of filament but heat and heat expansion of the filament and/or the components may cause damage to the material of the nozzle 214, heater block 210, and/or heat sink 206. A loose fit, on the other hand, will prevent damage of material, but may allow leakage of filament.

Another problem with hot ends comes into play when replacing components. To replace components such as the barrel, a user must remove wires on the heater block and/or heat sink, and then unscrew the nozzle, then unscrew the heater block. Then the barrel can be removed. Otherwise, if a user wants to keep the wires attached to the hot end assembly, a user must remove the entire hot end assembly, unscrew the heat sink and then unscrew the heater block.

The entire process requires much time and great precision. If a user wants to keep the wires attached to the hot end assembly, the user must remove the entire hot end assembly, unscrew the heat sink, and then unscrew the heater block.

A unique hot end design includes a unique heat break referred to as a barrel that is separate and wholly independent from the other components and which allows for a quick and easy exchange of components. In addition, the unique design accommodates different nozzle requirements and different filaments of varying size in diameter. Various views of a separable barrel 307 that is removably attached to the heat sink at one end and the nozzle at the other end are shown in FIGS. 8a and 8b. Various views of the nozzle 314 are shown in FIGS. 9a and 9b.

Figures 10A, 10B, 10C:
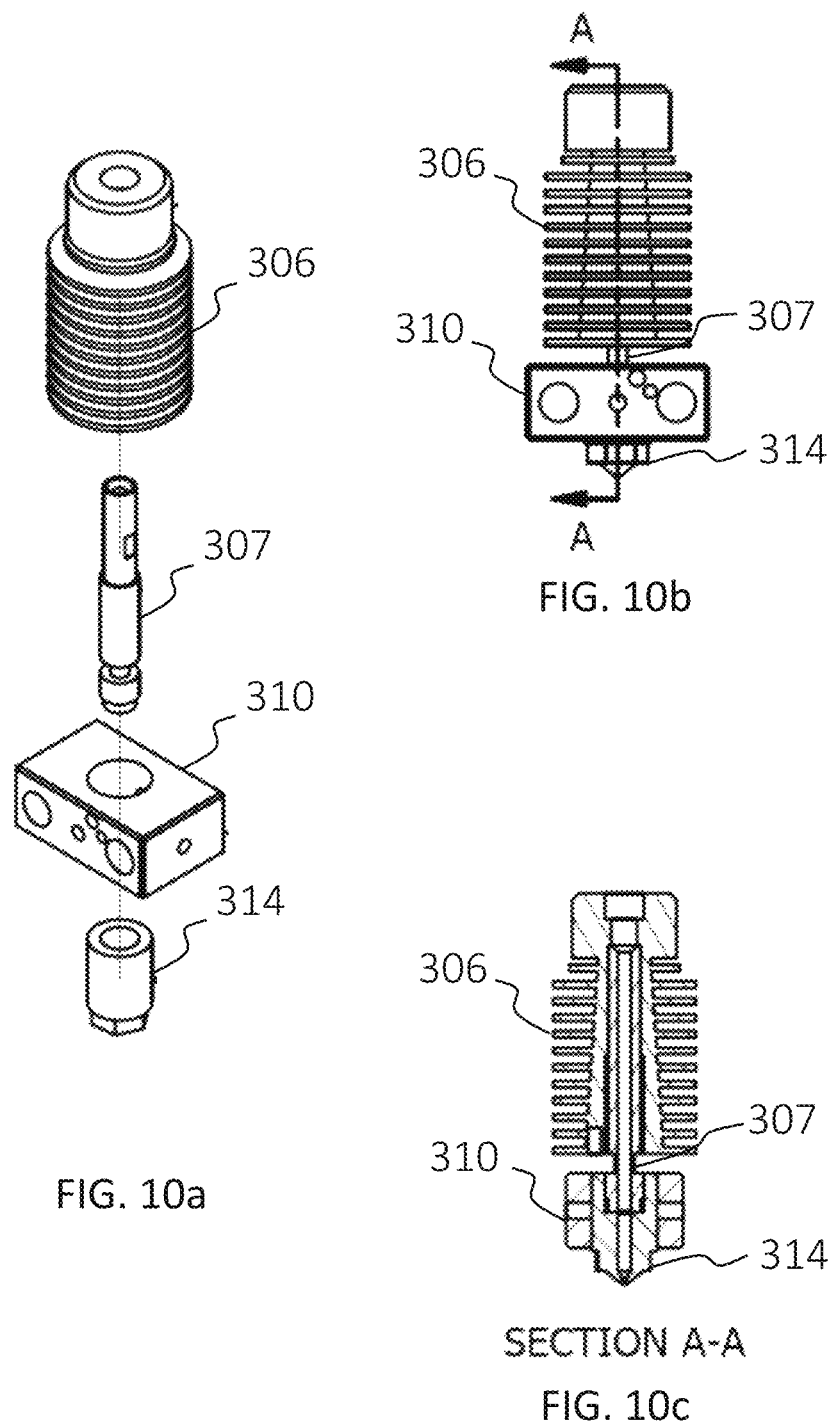
FIG. 10a shows an exploded view of a hot end.
FIG. 10b shows a front view of a hot end.
FIG. 10c shows a cutout view of a heat break.

FIG. 10a illustrates an extruded view of a heat sink 306, barrel 307, heater block 310 and nozzle 314. The barrel 307 is shown as a separable component from the heat sink 306 and the nozzle 314. By replacing the heat sink connection of a direct drive extruder with a barrel that directly screws onto the nozzle and the heat sink, a user no longer needs to remove any screws and does not affect any wires on the heater block and/or heat sink. The heater block 310 slides off the nozzle 314. Then, a second heat sink can be attached to the barrel. Or, a second nozzle can slide onto the heater block and be tightened with a set screw. Also, a new barrel and/or new nozzle can be pre-tensioned as a separate assembly. This design instantly improves the manner in which extruders are removed and replaced. A single hand twist removes the barrel 307 and the nozzle 314 from the hot end. Also, it provides a barrel and nozzle assembly with a universal fit. For example, a nozzle that is designed for a 1.75 mm filament may be easily replaced with a nozzle that is designed for a 3 mm filament. After replacing the nozzle, a single hand twist installs the new nozzle onto the hot end. A side view of the hot end is shown in FIG. 10b and a cutout side view of the hot end is shown in FIG. 10c.

The heater block 310 for the unique design includes a hole therethrough in which at least a portion of the nozzle 314 may be insertably removed. The hole of the heater block 310 may have a smooth interior walls that allows the nozzle to be slidably inserted with a loose, snug, or friction type fit. The heater block 310 may further include a small hole by which the heater block is fastened to the nozzle with a set screw.

A first threaded portion 330 of the barrel 307 attaches to a threaded end portion 322 at a distal end of the heat sink 306. A second threaded portion 332 of the barrel 307 attaches to a threaded portion 316 at a proximal end of the nozzle 314.

To dissemble the hot end for easy replacement, the set screw is unscrewed from the heater block 310 and the barrel 307 and nozzle 314 are unscrewed from the heat sink 306 and slidably removed from the heater block 310. A second heat sink 306 can then slide onto the heater block 310 and be attached. Also, the barrel 307 and/or nozzle 314 can be replaced. The heater block 310 and its wires remain attached. This design instantly improves the manner in which extruders are removed and replaced.

Figure 11A:
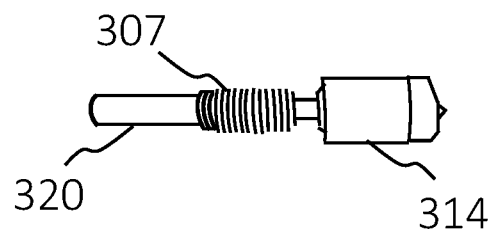
FIG. 11a shows a side view of a barrel and nozzle.

Dimensions (e.g. length, diameter, etc.) of the barrel 307 are made to accommodate the heater block 310, heat sink 306, and nozzle 314. The distal portion of the barrel 307 includes exterior threads configured to be used with a corresponding threaded end of the nozzle 314. FIG. 11a shows the barrel 307 pre-tensioned with the nozzle 314.

The distal portion includes a length and diameter to accommodate a fit with an end of the nozzle 314. Alternatively, the distal portion may include an opening for the end of the nozzle 314 to be inserted, the opening having threads for a screw fit with an end of the nozzle 314. Various other types of connections, including a snap fit, or other type of fit, may be used.

Figure 11B:
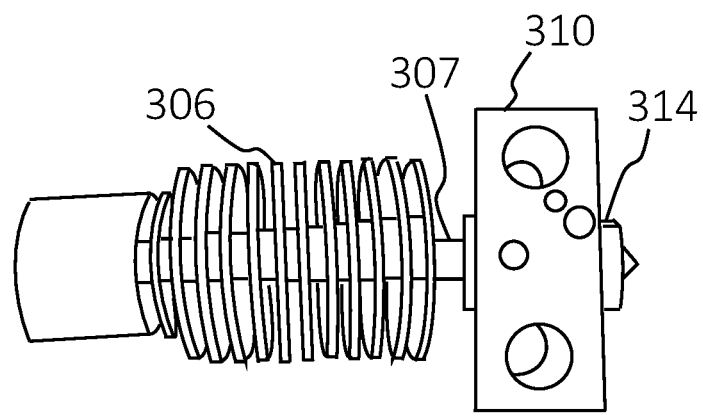
FIG. 11b shows a side view of a hot end.

Also shown in FIG. 11a is the proximal end of the barrel 307 including a smooth end section 320 that fits within the threaded end portion 322 or other hollow within the heat sink 306. The smooth end section 320 is removably inserted a length within the threaded end portion 322 of the heat sink 306 when the threaded end portion 322 is threaded within the threaded distal end section of the heat sink, as seen in FIG. 11b. The smooth end section 320 may contact a portion of the interior threaded end section 322. Alternatively, the smooth end section 320 may be free floating inside the interior threaded end section 322 such that an axial space is defined between the smooth end section and the heat sink. In either case, the smooth end section 320 acts as a second heat sink for heat that rises from the bottom of the nozzle.

Figure 11C:
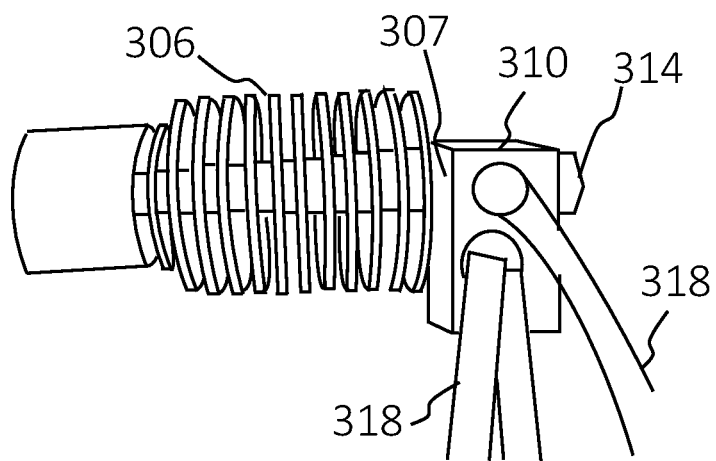
FIG. 11c shows a side view of a hot end.

FIG. 11c shows the hot end assembly having wires 318. With the unique design of the barrel 307 and nozzle 314, the wires 318 do not have to be removed to replace the nozzle 314, heat sink 306, or barrel 307. As discussed above, the heater block 310 merely slides off the nozzle 314 when a set screw or other locking structure is removed from the heater block 310.

A second improvement to the hot end assembly includes a coating at the end of the nozzle. A purpose of the hot end is to ensure that heat does not travel up the plastic and melt it prematurely before it reaches the nozzle. When the hot end is not cooled properly, filament starts getting viscous too high up in the hot end. This phenomenon is called heat creep and it causes jamming of the filament, especially with PLA, within the hot end. The filament liquefies too high up within the hot end and the extruder has to exert more force to push filament through the nozzle until the filament eventually gets stuck inside the extruder. A unique hot end design uses material in a way to cut down on heat creep on the filament. Particularly, a nickel coating can be used to prevent the heat from rising upward in the hot end, and thus protect the filament from liquefying. A nickel coating is also beneficial by having good wear resistance properties which protects the life of the nozzle. Other types of metal coatings may be used instead.

The nickel coating may coat the entire length of the nozzle or a portion thereof. The coating may start at an end or near the end of the nozzle. A continuous coating may be used. Alternatively, a discontinuous coating may be used. For example, various sections of the nozzle may be coated.

In addition to coating the nozzle, metal coatings on the barrel may be used to prevent heat resistance. Particularly, using a different combination of metals in the barrel can also help prevent heat creep.

FIGS. 12a, 12b, 12c, 12d, 12e, and 12f show an exemplary fan accessory 400 attached to the extruder. In many 3D printers, the heat sink duct has one or more lathes that tend to force air to hit the center of the heat sink and create a dead zone that results in stagnant air flow. The fan accessory 400 is thus designed to minimize this issue by diverting air flow around the hot end.

Figure 12A:
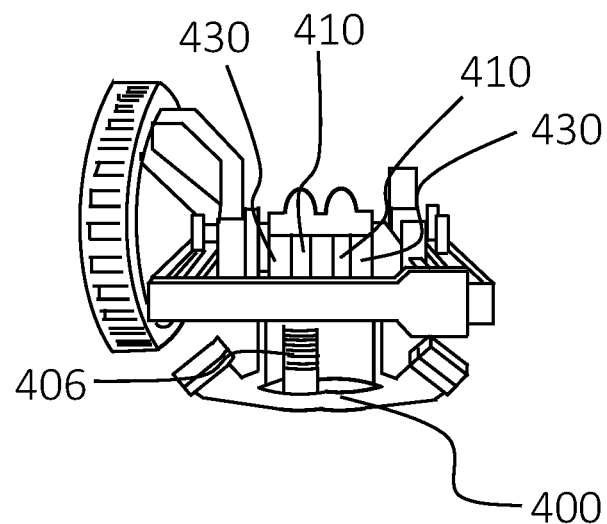
FIG. 12a shows a front view of a printerhead carriage assembly with a fan accessory.
Figure 12B:
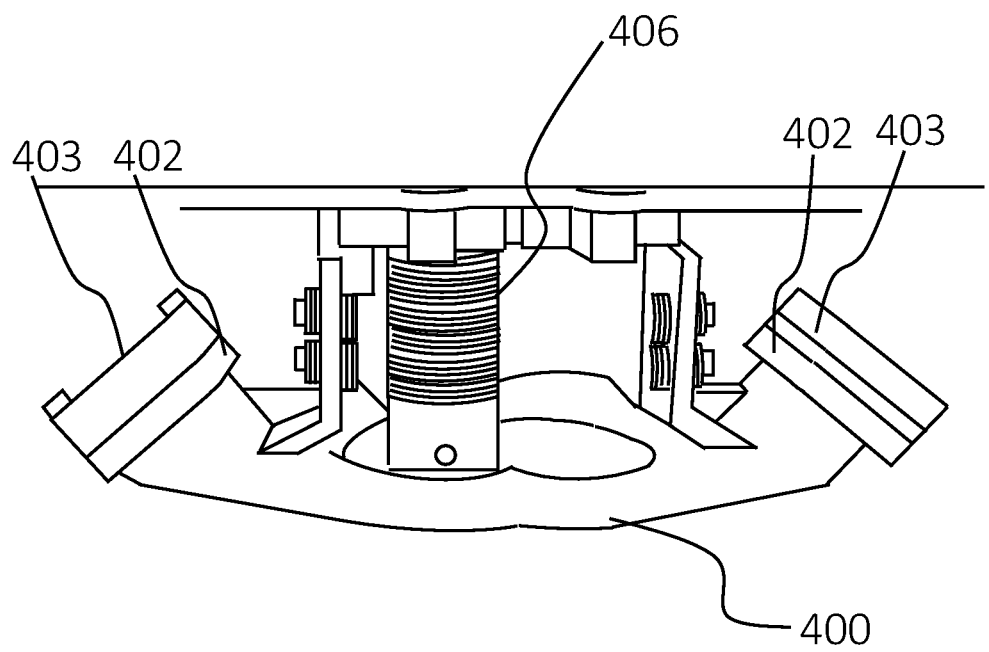
FIG. 12b shows a front view of a fan accessory.
Figure 12C:
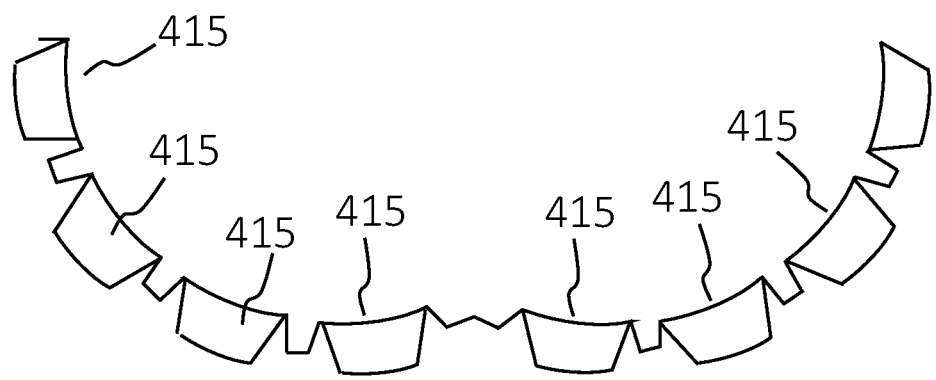
FIG. 12c shows a top view of a fan accessory.
Figure 12D:
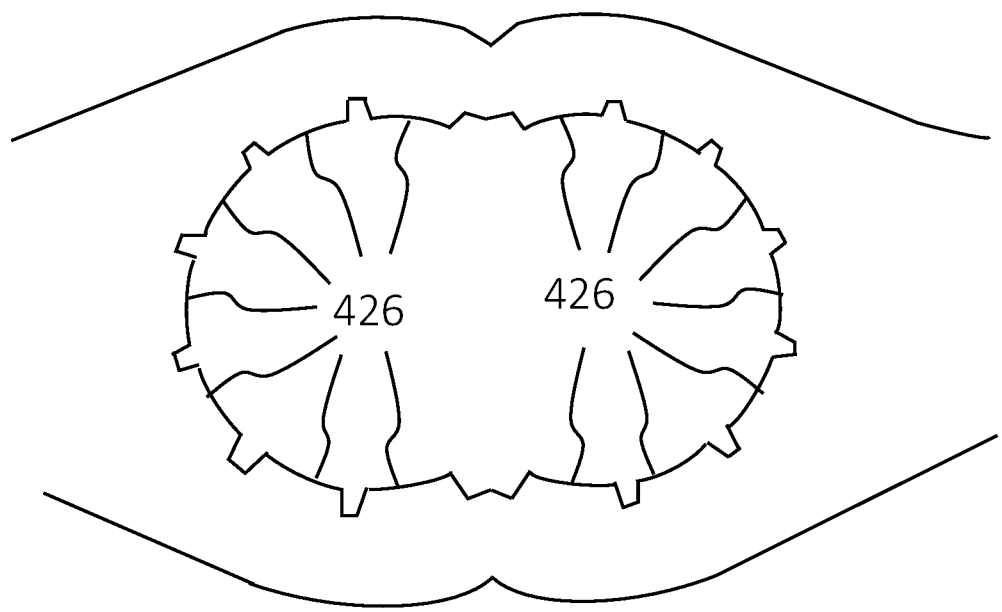
FIG. 12d shows a bottom view of a fan accessory.

The fan accessory includes attachment structure for attaching to a heat sink. As seen in FIGS. 12a and 12b, the exemplary fan accessory 400 includes two upper walls 430 attached to joiner walls 410 of the heat sink 406. A slot joiner or other type of joiner allows the fan accessory 400 to be raised at a fixed height above the fixed substrate and be adjusted as necessary.

Figure 12E:
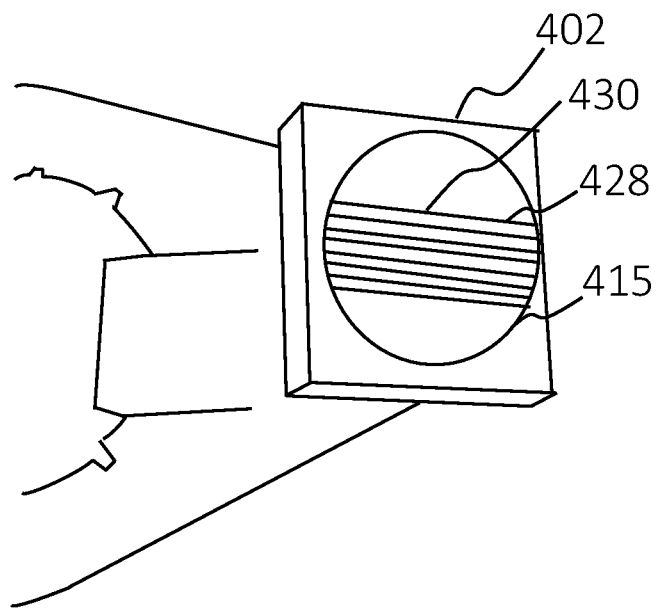
FIG. 12e shows a perspective view of a fan casing.

The fan accessory 400 further includes two fan casings 402 diametrically opposed from each other and offset from the extruder(s) by a sufficient width to allow airflow to be generated around the hot end. The fan casings 402 each include structure for attachment to a fan 403. This may include a plate or flat surface that allows for a flush mount of the fan 403 as shown in FIG. 12e. Attachment may be accomplished through small holes at the corners of the plate, or flat surface, for screws to attach to corners of the fan. The plates or flat surface 402 are angled at approximately a 45 degree relative to the XY plane, however, the angle may be any angle from 20-80 degrees.

The plate or flat surface is part of a channel 415 that directs air flow from the fan 403 downward at a 45 degree angle or other angle. The plate or flat surface includes a central opening for air flow to be directed within the channel 415. Each channel 415 bifurcates to form a curved path around the hot end 401, and more particularly, to define a rounded channel 416 shaped like two arcs that meet together at ends. The rounded channel 416 includes a plurality of secondary channels 418. The secondary channels 418 each have an outlet 420 that is directed toward the end of the hot end 401. Air flow in the channel 415 is divided into the secondary channels 418 so as to create a generally even distribution of air flow within the space defined by the curved path.

Figure 12F:
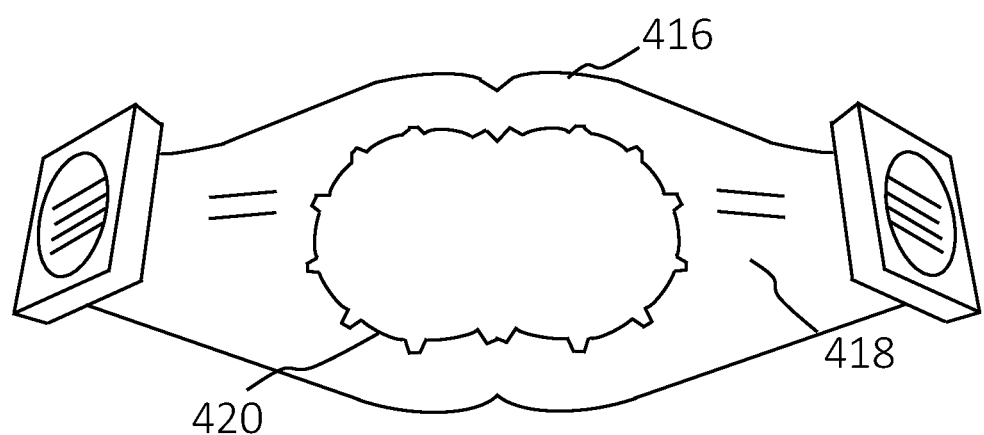
FIG. 12f shows a perspective view of a fan accessory.

This may be accomplished, for example, with a gating structure 428 that distributes air flow evenly from within the channel 415 to the plurality of secondary channels 418. The gating structure 428 may include divider walls 430 as shown in FIGS. 12e and 12f that extend between interior walls of the fan casing 402 and channel 415. The divider walls 430 may be close together near the center of the fan casings 402 to optimize air distribution in a proportional manner. The divider walls 430 section the air flow from the fan and the sections of air flow merge with the plurality of secondary channels 418, or veins, within the rounded channel 416, each secondary channel 418 directed to a corresponding outlet 420.

A plurality of outlets 420 are located along interior surface walls of the rounded channel 416 and are directed inward toward the central opening formed by the rounded channel 416. The outlets 420 include small awnings 426, or shielded openings, that are angled downward relative to the substrate such that air flow is directed with a downward facing angle relative to the substrate.

Embodiments may include only one upper wall, or more than two upper walls as desired, that join with the fan accessory 400. Also, the channel 415 may include any desired shape, including circular, oval, square, star-shape, and other known shapes in the art. There may only be one fan, or a plurality of fans. Instead of a shielded opening, the outlets may have no shield or a shield that is not angled downward. For example, a shield may extend horizontally with the XY plane. Also the shield angle relative to the XY plane may be −45 degrees or any angle between −20 and −80 degrees.

Another problem with extruder components is that they are not easy to remove and replace. For example, a belt that is attached will have to be untensioned when removing it and re-tensioned when re-attaching it. An improved print head includes modular components that benefit the user for servicing and assembly of the print head. As shown in FIGS.

13a, 13b, 13c, 13d, and 13e, the improved print head 500 includes one or more modular components of at least one of an extruder 502, a motor and gear housing 504, a printerhead carriage 506, a micrometer mount 508, and a hot end 510. Also, certain components may be swapped out, such as the extruder and motors, and replaced with a laser engraver and a CNC rotor, not shown.

Figure 13A:
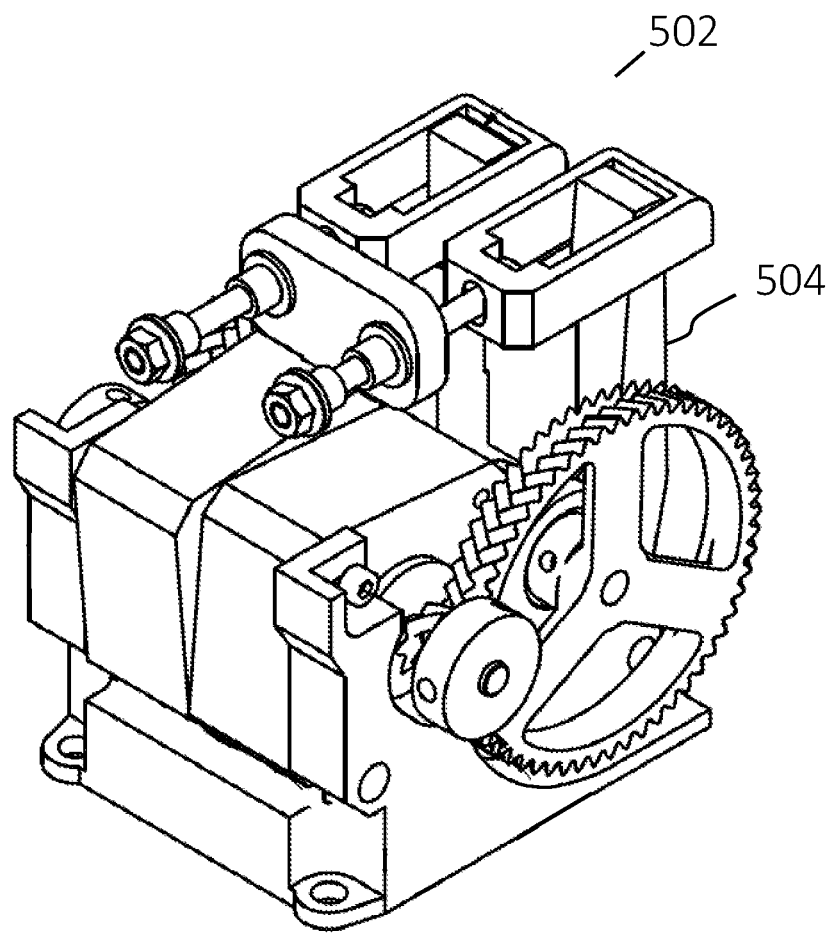
FIG. 13a shows a perspective view of a printerhead carriage assembly.
Figure 13B:
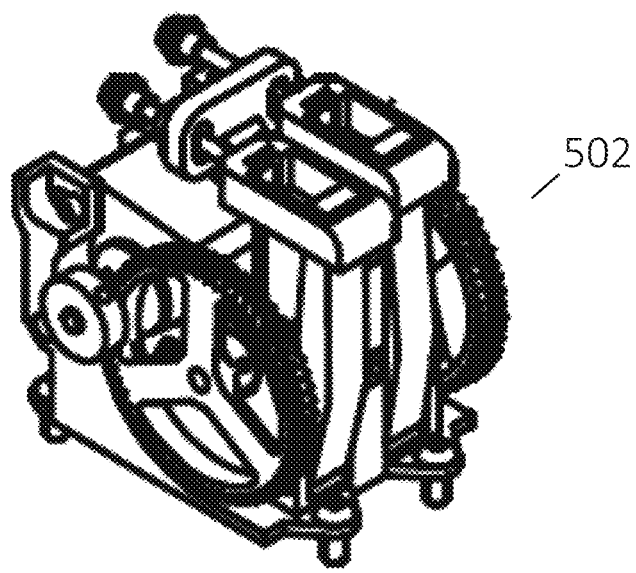
FIG. 13b. shows a perspective view of a motor and housing.
Figure 13C:
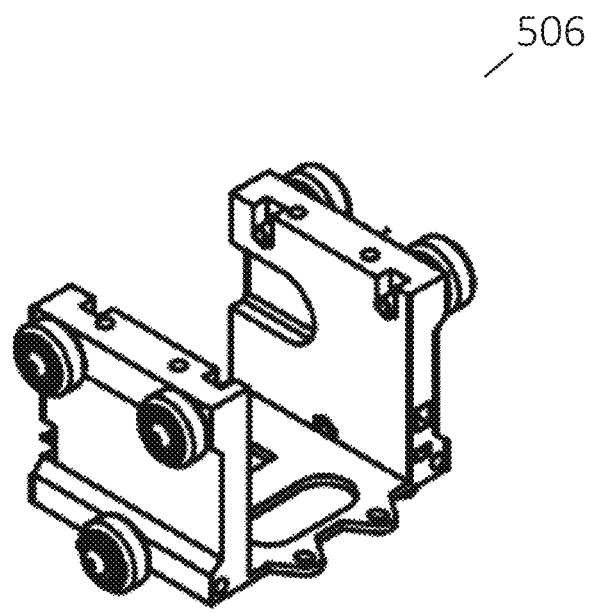
FIG. 13c shows a perspective view of a printerhead carriage.
Figure 13D:
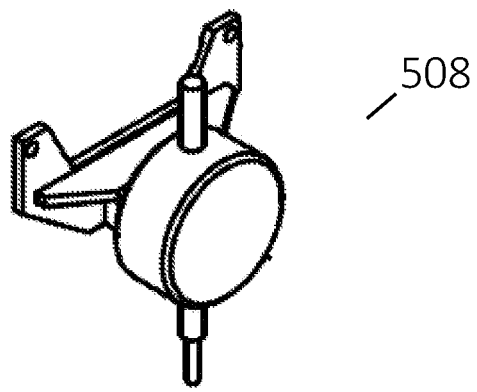
FIG. 13d shows a perspective view of a micrometer.
Figure 13E:
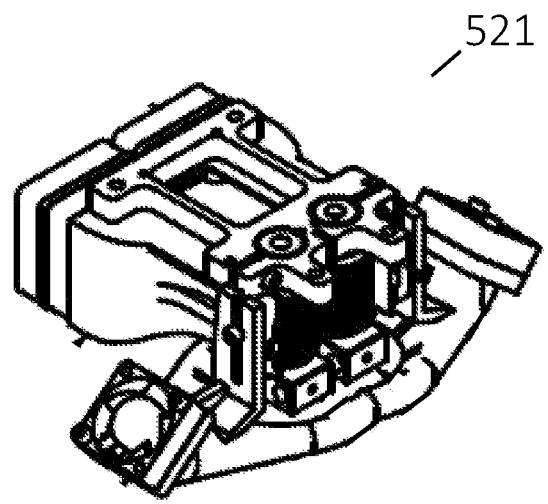
FIG. 13e shows a perspective view of a printerhead carriage assembly with a fan accessory.

FIG. 13a depicts a modular extruder 502 including a modular motor and gear housing 504 that includes a compression arm, a filament tensioner, two extruder motors (e.g. Nema 17 21 mm), an extruder gear (e.g. gear ratio 1:7), and drive gear. FIG. 13b depicts the motor and gear housing. FIG. 13c depicts a modular printerhead carriage 506. FIG. 13d depicts a modular micrometer mount 522. FIG. 13e depicts a modular heat sink 521 and other components, including the hot end plate, hot end, nozzle duct, heatsink duct, nozzle fans, etc.

For assembly, the modular print carriage 506 as shown in FIG. 13c includes four bolt holes on top surfaces of side walls that align with, and may be used to attach to, corresponding bolt holes on a bottom surface of the motor and gear housing 504. The modular print head has four bolt holes on a bottom surface that align with, and may be used to attach to, corresponding bolt holes on a top surface of the hot end plate. The attachments allow the assembly and disassembly of individual components in an easy, efficient manner.

The modular print head 500 further includes two bolt holes, one on each side walls that aligns with, and may be used to attach to, corresponding bolt holes on end walls of the micrometer mount 522. The micrometer mount 522 is mainly used for leveling a fixed substrate and therefore, once this is accomplished, easy attachment and removal is helpful.

Bolt holes on the hot end plate 524 align with and may be used to attach to corresponding bolt holes 538b of the heatsink duct. Bolt holes on the heat sink duct align with and may be used to attach to corresponding bolt holes on the nozzle duct. Also, a user may adjust the height of the nozzle duct to attach a volcano extruder (not shown) or other type of extruder.

In addition to making components be modular, another improvement is in the components themselves. Typically, the motor drives the hobbed gear to bite on the filament and push it down through the hot end. Small motors (e.g. motors that weigh 50 grams or less) are not normally used for print heads because they are weak with a low holding torque. A gearing system, however, allows small motors to be included. The size of the gears can be smaller (i.e. smaller width and smaller diameter) and have better wear resistance when they are made of better materials, such as nylon. Also, the gear ratio can be optimized with smaller, better quality gears.

Figure 14A:
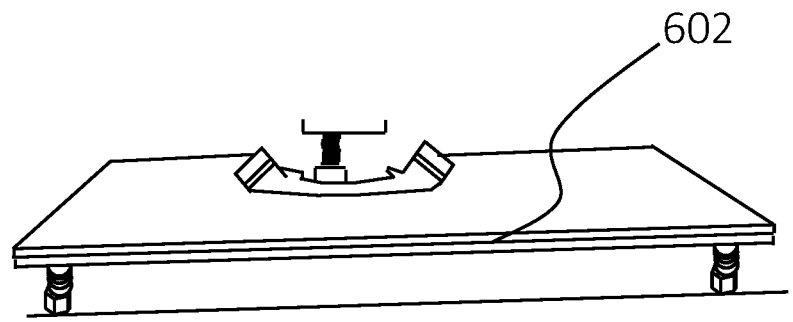
FIG. 14a shows a perspective view of a fixed substrate.
Figure 14B:
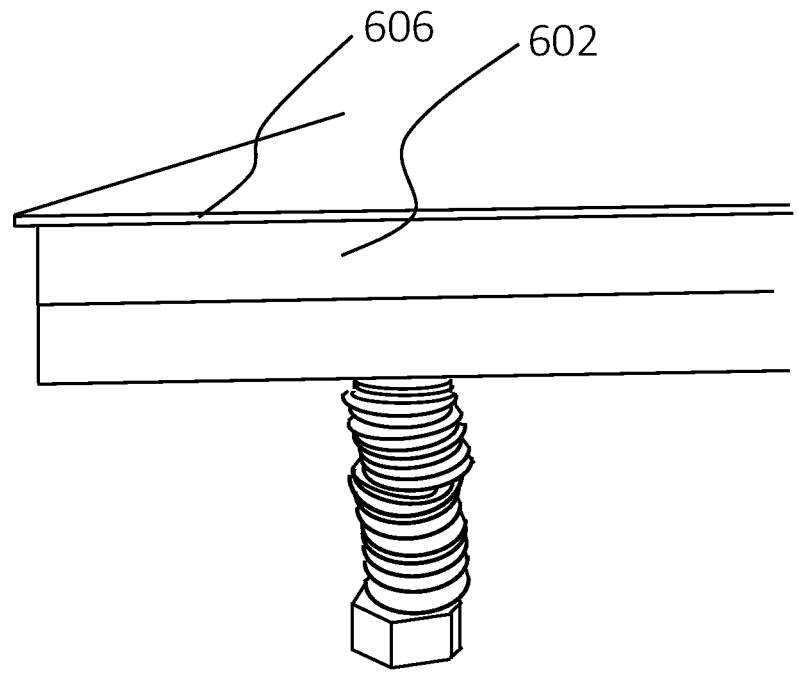
FIG. 14b shows a front view of a fixed substrate.

Turning to FIGS. 14a and 14b, the fixed substrate 602 is shown. With the print head moving in an XYZ spatial type movement, the substrate 602 can remain fixed. As stated previously, prior-art substrates in the 3D printing field often move in the vertical (i.e. Z axis) direction or the horizontal (i.e. Y axis) as controlled by software. Each vertical movement provides a desired height for a given layer. Each horizontal movement provides a desired width for a given layer. Unfortunately, the substrate does not always remain level with the XY plane when it is moved along the Z axis or the Y axis. An uneven substrate provides a poor surface for layering material to form a prototype. Furthermore, an uneven substrate can make the nozzle collide with a previous layer and thus disrupt or even completely halt a prototype from being formed.

Another reason that the substrate may become uneven is due to the material of the substrate. For example, a substrate made of acrylic or glass or a substrate intentionally made thin to reduce weight easily warps over time.

Warping may also be caused by surface treatments (e.g. painter's tape, PVA, glue, Kapton tape, PEI (Polyetherimide)) that are used to cover a top surface of the substrate and which provide a reusable build surface for forming prototypes. The surface treatments have different stretch properties than the substrate which causes warping of the substrate, especially in thin substrates that were intentionally made thin to reduce weight.

An improved substrate 602 is fixed and is made of metal that is not prone to warping. A surface treatment 606, such as PEI, provides a surface that will last for a long time and consistently provide a surface that will stick to the prototype to prevent it from moving.

Another problem with common substrates is that they have four points of support that may be adjusted to level the substrate. An improved fixed substrate uses three points with three additional floating points. Fewer or additional points may be used as desired. The three floating points may include spring-loaded support members as shown in FIG. 14b and that may be moved around manually as desired. In this manner, the substrate 602 can remain fixed and level, or adjusted easily if necessary.

Figure 15A:
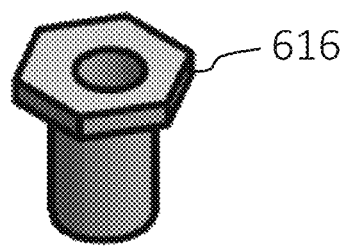
FIG. 15a shows a perspective view of an offset.
Figure 15B:
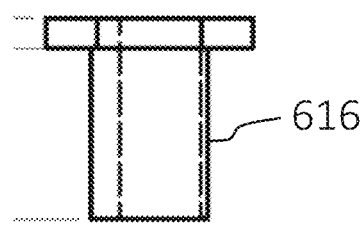
FIG. 15b shows a front view of an offset.
Figure 15C:
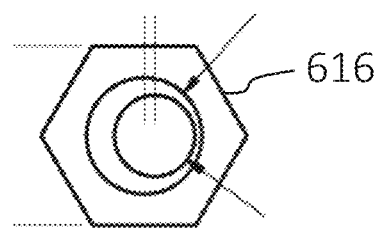
FIG. 15c shows a top view of an offset.

Most, if not all, of the printer can be made with extruded aluminum, which typically comes in batches. Aluminum is extruded through a die, which changes in tolerance from batch to batch, resulting in parts with dimensions that include variations. The printer is thus built to fit a certain tolerance, knowing that a batch may be bigger or smaller. An improved design includes offcenters 616 that are used to make up the difference of variation, as shown in FIGS. 15a, 15b, and 15c. Another purpose of the offcenters is to help wheels (not shown) stay in place. Since the wheels are often made of plastic, they wear down over time. Even fractions of a millimeter over time can make a difference, with $\frac{1}{10}$ mm translating to approximately a $\frac{1}{2}$ mm of vertical play on the end of the arm. Thus, offcenters are used to make the wheels stay in the right place.

The present design may have normal print speeds but may further include speeds in excess of 150 mm per second, or greater. The single arm of the design is largely made possibly by using lightweight components (e.g. motors, etc.), a gearing system, a direct drive extruder, and offcenters that fit wheels that travel on the Z axis and Y axis. The print head is designed for precision, such that it can go to the same point, or nearly the same point, every time it is identified by the software. With solid construction, the components are still light enough to be moved. The frame also has a solid construction such that the components are supported well.

Figure 16A:
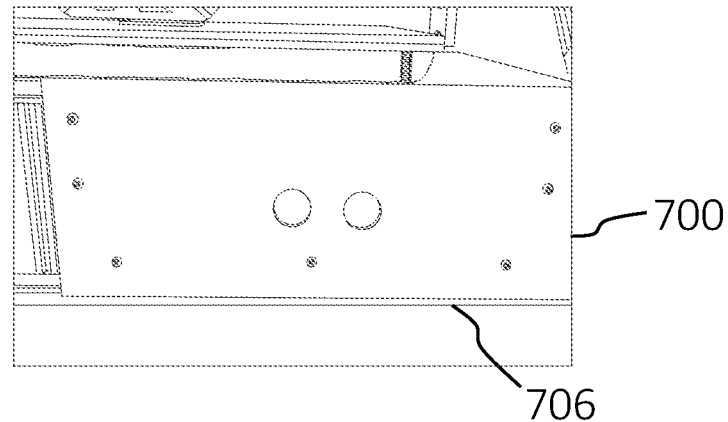
FIG. 16a shows a front view of a storage drawer.
Figure 16B:
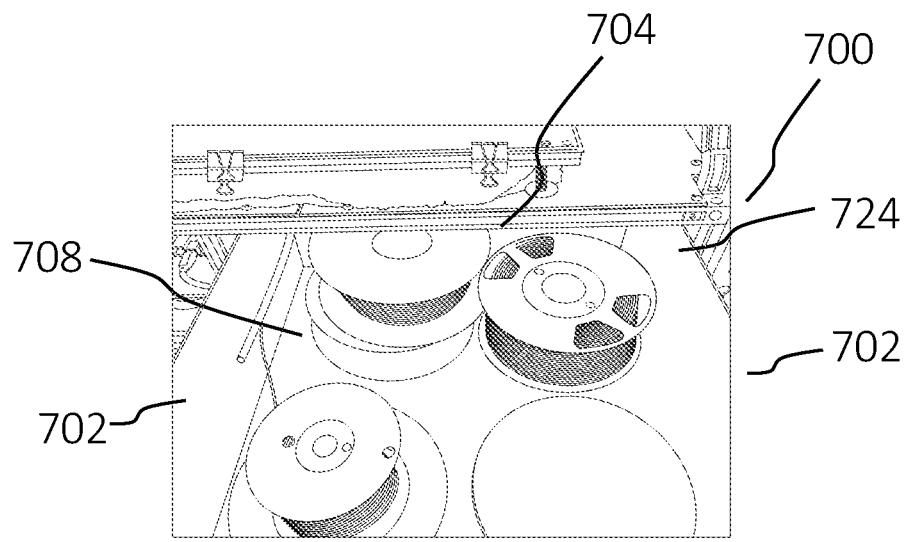
FIG. 16b shows a perspective view of an interior of the storage drawer.

FIG. 16a and FIG. 16b show a containment 700 or housing for storing and using filaments. The containment 700 may be a drawer that includes a space to house one or more filaments 724, as shown in FIG. 14b. The containment 700 is kept mainly sealed off from an external environment. The containment 700 includes sidewalls 702, a back wall 704, and a front wall 706, and a bottom surface 708. The containment 700 may further include a top surface or use an underside of a substrate or a lower layer of the substrate as a top surface. The bottom surface and top surface may include one or more openings that serve as vents.

Figure 17A:
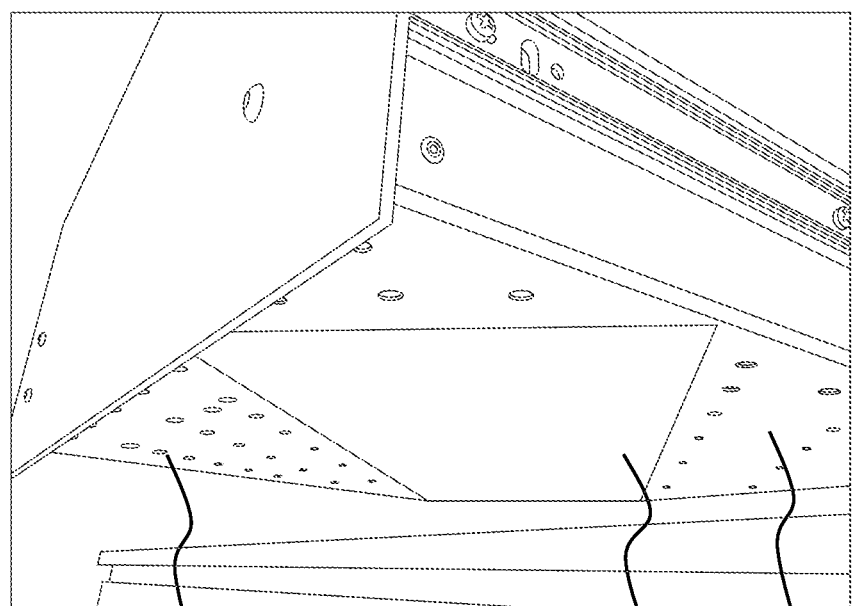
FIG. 17a shows a perspective view underneath the storage drawer.
Figure 17B:
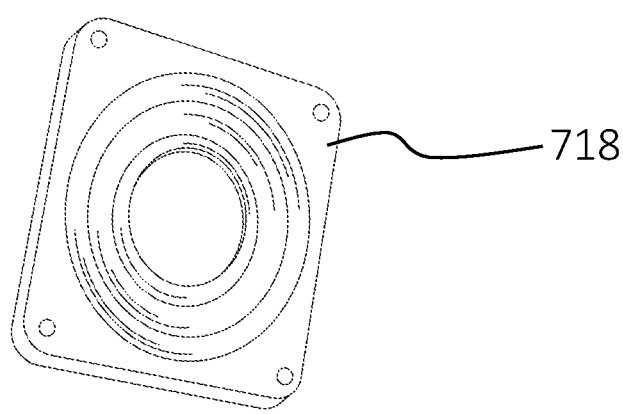
FIG. 17b shows a spinner used to rotating filament spools.

The containment 700 is configured to maintain a desired environment for the filaments. Turning to FIG. 17a, the containment 700 is shown with exemplary dehydrator 714 that includes a plurality of vents 712 as shown on the bottom surface 708 of the containment. One or more vents 712 may also be present on the top surface 710. The vents 712 may include equally spaced holes or an array of spaced holes, the holes having similar or different diameters. The holes may further include shapes such as circles, ovals, squares, rectangles, parallelograms, etc.

The dehydrator 714 may further include a heat component, such as the heater 716 attached to an underside of the bottom surface 708 as shown in FIG. 17a and which is used to further the dehydration process.

One or more rotating disc assemblies are shown placed on the bottom surface 708 and used for placement of filament spools 724. The rotating disc assemblies include rotating discs, which are generally circular platforms that may be rotated. The assembly may further include spinners, which are rotating elements that spin the rotating discs. A magnetized spinner 718 as shown in 17b may be attached to the discs to keep the discs in a desired location in the drawer. The rotating disc assemblies are placed in the containment 700 and the filament spools 724 rest on top of the discs 718 or may be attached to the discs. This configuration allows the filaments 724 to be pulled out of the containment 700 as the spool is turned on the rotating disc assembly 718.

Further to the containment may be an opening (not shown) that communicates with the printer such that filament may be drawn out of the opening and moved to the extruder for use. An integrated draw (not shown) for drawing the filament out of the drawer may be incorporated as well.

For a rapid prototyping process, a 3D printer is generally connected to a computing device or other device capable of dispatching software instructions to a 3D printer. For example, devices may include desktops, laptops, smart phones, personal display assistants, smart watches, virtual environments, or other known computing environments or technology. Computer instructions used by the device may be stored in volatile memory, non-volatile memory, another computer-readable storage medium such as a CD or DVD, on a remote device or any other computer-readable storage medium known in the art. Communication technologies, e.g., buses or otherwise, may be wired, wireless, a combination of such, or any other computer communication technology known in the art.

Figure 18:
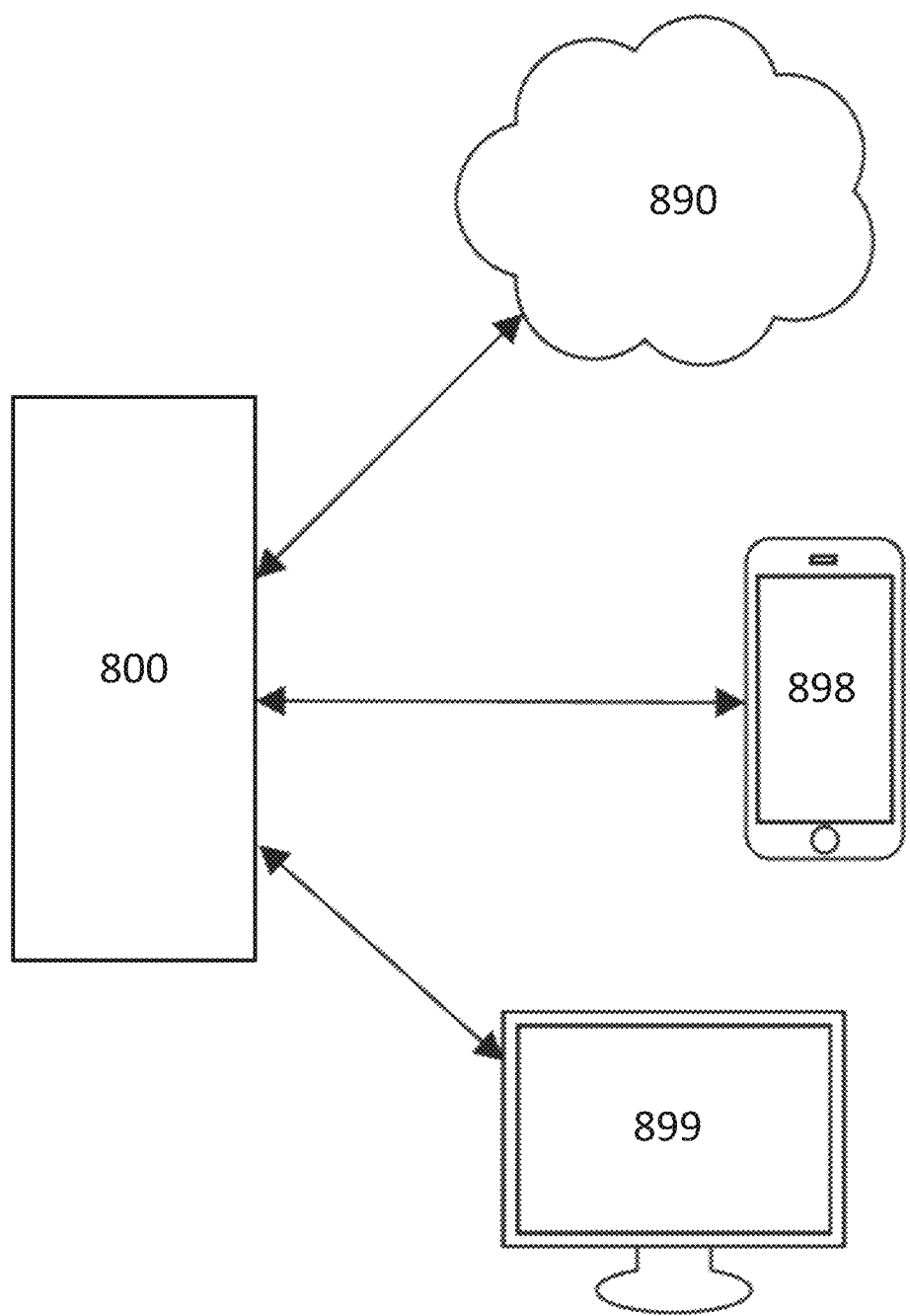
FIG. 18 shows an exemplary computing environment used herein.

Turning to FIG. 18, a high-level overview is shown of various components disclosed herein that control a 3D printer system. An exemplary 3D printer device 800 is shown connected to a network 890, a computing device 898, and a server 899. The device 800 shown represents a 3D printer and/or various components, described herein. The device 800 may be connected to one or more of the components shown. Variations include no established connection, however.

Server 899 may comprise a computing device designed and/or configured to execute computer instructions, e.g., software, that may be stored on a non-transient computer readable medium. For example, but without limitation, server 899 may comprise a server including at least a processor, volatile memory (e.g., RAM), non-volatile memory (e.g., a hard drive or other non-volatile storage), one or more input and output ports, devices, or interfaces, and buses and/or other communication technologies for these components to communicate with each other and with other devices. Computer instructions may be stored in volatile memory, non-volatile memory, another computer-readable storage medium such as a CD or DVD, on a remote device, or any other computer readable storage medium known in the art. Communication technologies, e.g., buses or otherwise, may be wired, wireless, a combination of such, or any other computer communication technology known in the art. Server 899 may alternatively be implemented on a virtual computing environment, or implemented entirely in hardware, or any combination of such. Server 899 is not limited to implementation on or as a conventional server, but may additionally be implemented, entirely or in part, on a desktop computer, laptop, smart phone, personal display assistant, virtual environment, or other known computing environment or technology.

The computing device 898 may comprise any computing device capable of receiving input from a user, including a mobile device, mobile accessory, smart phone, smart watch, personal display assistance, traditional desktop, laptop, tablet, and other devices.

The computing device 898 may be in communication with the server 899 via any communication technology known in the art, including but not limited to direct wired communications, wired networks, direct wireless communications, wireless networks, local area networks, campus area networks, wide area networks, secured networks, unsecured networks, the Internet, any other computer communication technology known in the art, or any combination of such networks or communication technologies. The computing device 898 may communicate with server 899 via network 890, which may be the Internet, network, the cloud, virtual forum, or any other established software connection in the art.

The device 800 may further be in communication with an external source via any communication technology known in the art, including, but not limited to, direct wired communications, wired networks, direct wireless communications, wireless networks, local area networks, campus area networks, wide area networks, secured networks, unsecured networks, the Internet, any other computer communication technology known in the art, or any combination of such networks or communication technologies. Internet platforms may include Echo, Apple Homekit, and Google platform, for example. For example, the device 800 may be controlled by an application, or app.

Platforms used therein include hardware, browser, application, software framework, cloud computing, virtual machine, virtualized version of a complete system, virtualized hardware, OS, software, storage, and other platforms.

The computing device 898 may include an interface for display, such as a display found on a computer display, smartphone display, or other visual display. Displays further include holographic displays, 3D displays, virtual reality displays, or other displays. For representations that include audio formats, the computing device 898 may include speakers, digital sound makers, and other devices that are known in the art and that produce sounds in an electronically controlled manner. For representations that include tactile formats, devices that output tactile displays may be used. Input for a computing device 898 may include, but is not limited to, a keyboard, mouse, touchscreen, trackpad, holographic display, voice control, tilt control, accelerometer control, or any other computer input technology known in the art.

Figure 19:
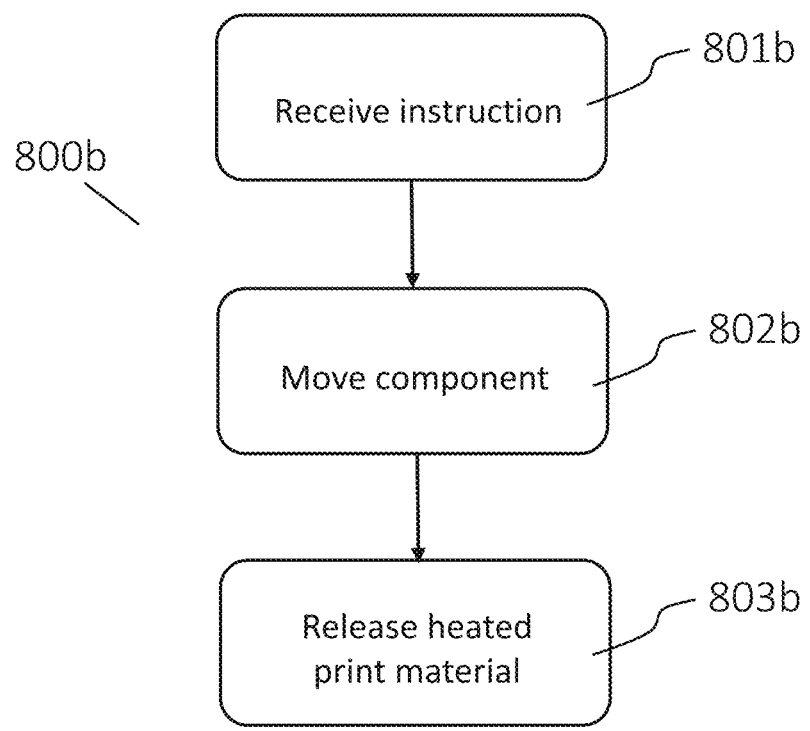
FIG. 19 shows a flow chart of methods presented herein.

Turning to FIG. 19, a flowchart 800b is shown illustrating steps for controlling features of a 3D printer. For purposes of explaining the flowchart 800b, steps will be described generally in relation to FIG. 16.

A first step 801b as shown in FIG. 19 includes receiving instructions from a user, server, or other source. The instructions regard the 3D printer including its various components described herein. For example, the instructions may be relative to two-dimensional slices of a three-dimensional object. For optimization, the instructions may be related to sensory feedback from a prior release of heated print material, such as a detected temperature of the print material or components, or recorded placement of the heated print material relative to the substrate. The instructions may provide time-release information, such as the time of release sought for the heated print material, or length of time that the heated print material is to be released.

Based on the instructions received, step 802b involves moving a component of the 3D printer. For example, the movement could involve the arm of the 3D printer in either the Y or Z direction, or a combination of both. The movement could also involve the print head in the X direction. Movement could also be related to feeding the filament through the printhead, testing motors or turning motors on/off, turning on sensors, requesting information from sensors, and other actions of components described herein.

A further step 804b includes the release of heated print material on the substrate, or overlaying a previous heated print material layer. The steps are not meant to be restricted to the order presented and steps may be repeated as needed.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other non-transitory computer-readable media for carrying or storing computer-executable instructions and/or data structures. Such computer-readable media may be any available media that can be accessed by a general-purpose or special-purpose computer system. Computer-readable media that store computer-executable instructions and/or data are computer storage media. Computer-readable media that carry computer-executable instructions and/or data are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media may include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media may be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, byte code, interpreted code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A system for printing a three-dimensional object includes the printer and its components described herein, along with computer-implemented remote access by which performance of the printer is enabled and controlled, including three-dimensional movement of the print head and control of the release of the heated printing material.

A computer-implemented method for controlling a scent dispersion device and a tray includes steps receiving an instruction for a 3D printer or various components of the 3D printer. For the instruction, the method further includes moving a component or performing an action related to a component, and releasing heated print material. A computer-implemented method for printing a three-dimensional object includes steps of providing a flat substrate that is fixed to a frame, a vertical support and a horizontal railing slidably attached to the vertical frame so as to move in a Z direction relative to the frame. An arm is slidably attached to the end of the horizontal railing in a X direction relative to the horizontal railing. The arm is attached so that the arm is positioned above and extending parallel to the substrate. A print head is slidably attached to the horizontal arm in a Y direction relative to the horizontal arm, movement of the print head and the arm together providing three-dimensional spatial movement. The printer receives instructions relative to two-dimensional slices of a desired three-dimensional object and moves the arm in one or more spatial Y or Z directions relative to a frame and/or moves the head in an X direction relative to the horizontal arm. Instructions may further include releasing heated print material through a feed outlet of the head onto the flat substrate.

An exemplary method is implemented at a computer system that includes one or more processors. An exemplary method may further be incorporated as a computer program product comprising one or more computer-readable storage media having thereon computer-executable instructions that are structured such that, when interpreted by one or more processors associated with a computing system, cause the computing system to perform method steps.

Leveling Mechanism

The bed assembly may include one or more leveling mechanisms that serve to level the bed relative to the printer head and/or fix the bed in a desired level position. A plurality of leveling mechanisms may be used at strategic locations on the frame. For example, a leveling mechanism may be located below each corner of the bed and at the midpoint along the side of one or more ends.

Figure 20A:
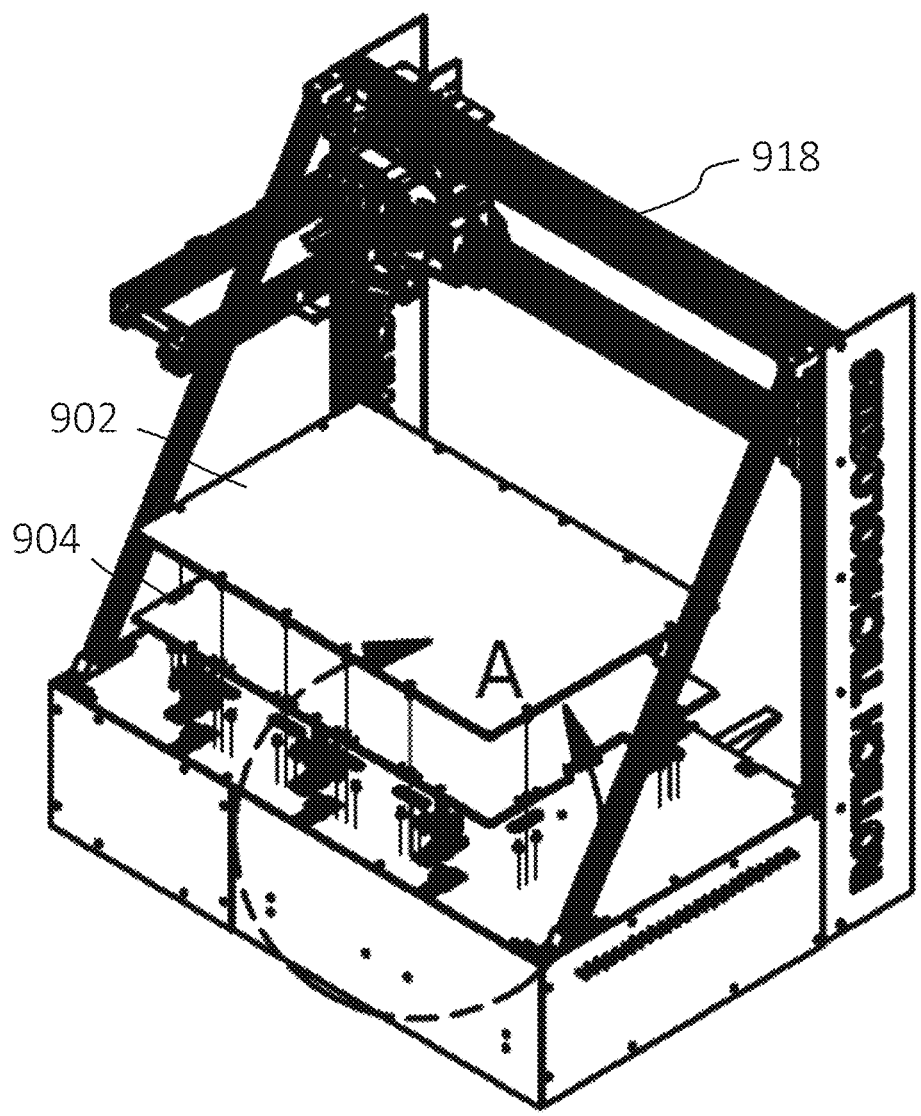
FIG. 20a shows an extruded view of substrates and a leveling mechanism in a 3D printer.
Figure 20B:
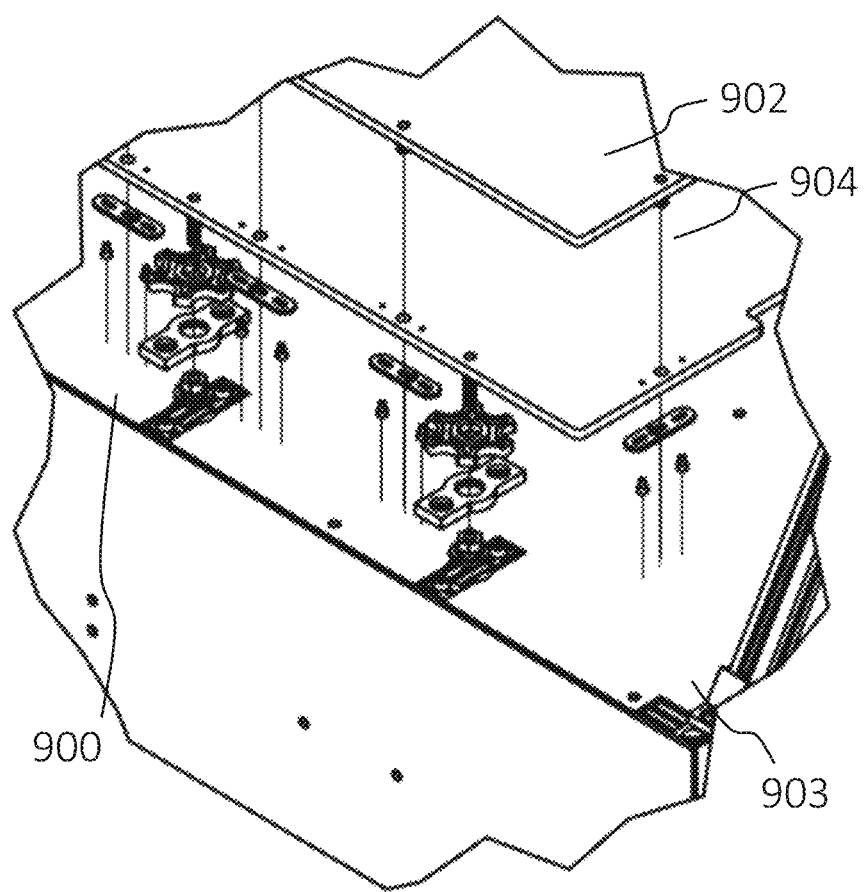
FIG. 20b shows an extruded close-up view of substrates and a leveling mechanism.

FIG. 20a illustrates an exemplary configuration that includes a printer with an extruded view of a bed assembly 901, the bed assembly 901 comprising a top substrate 902 and a bottom substrate 904. The bed assembly 901 may comprise more substrates or one substrate. As shown, the bed assembly is attached to the printer frame 918. A detail view of the attachment between a top substrate 902, bottom substrate 904, subassembly 903, and leveling mechanism 900 is shown in FIG. 20b.

Figure 21:
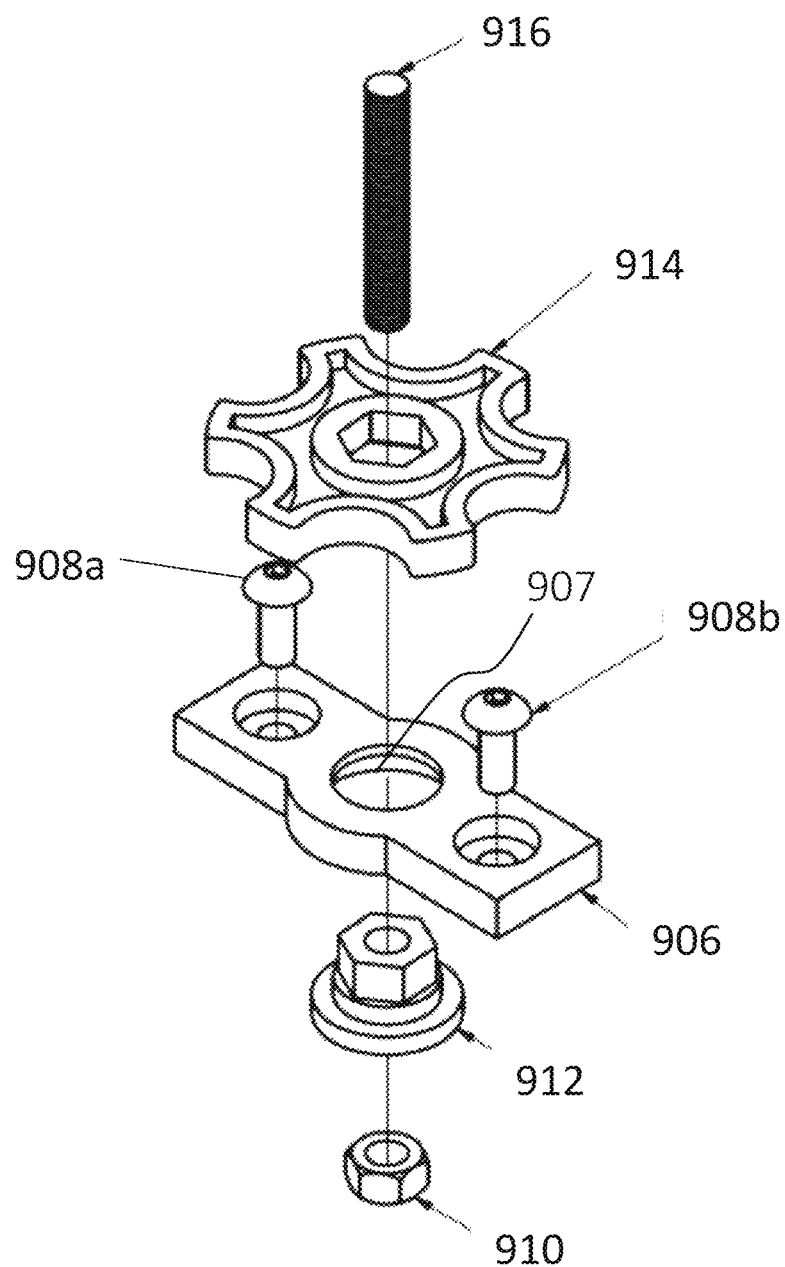
FIG. 21 shows an extruded view of a leveling mechanism.
Figure 22:
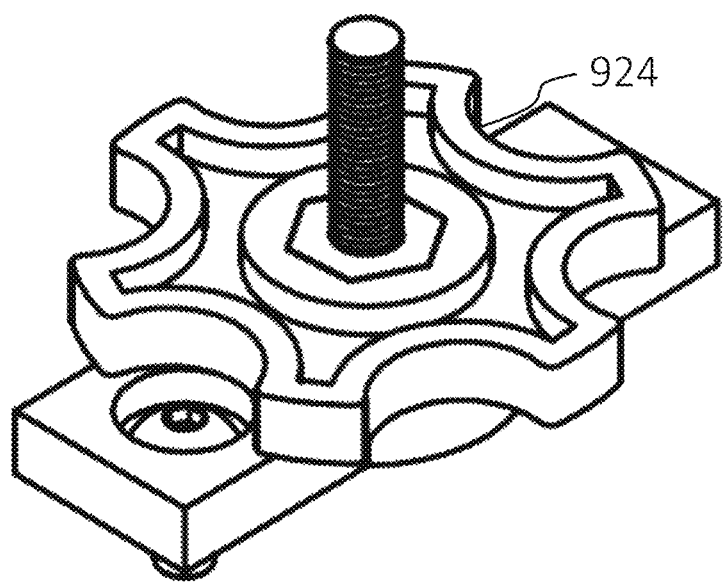
FIG. 22 shows a perspective view of a leveling mechanism.
Figure 23:
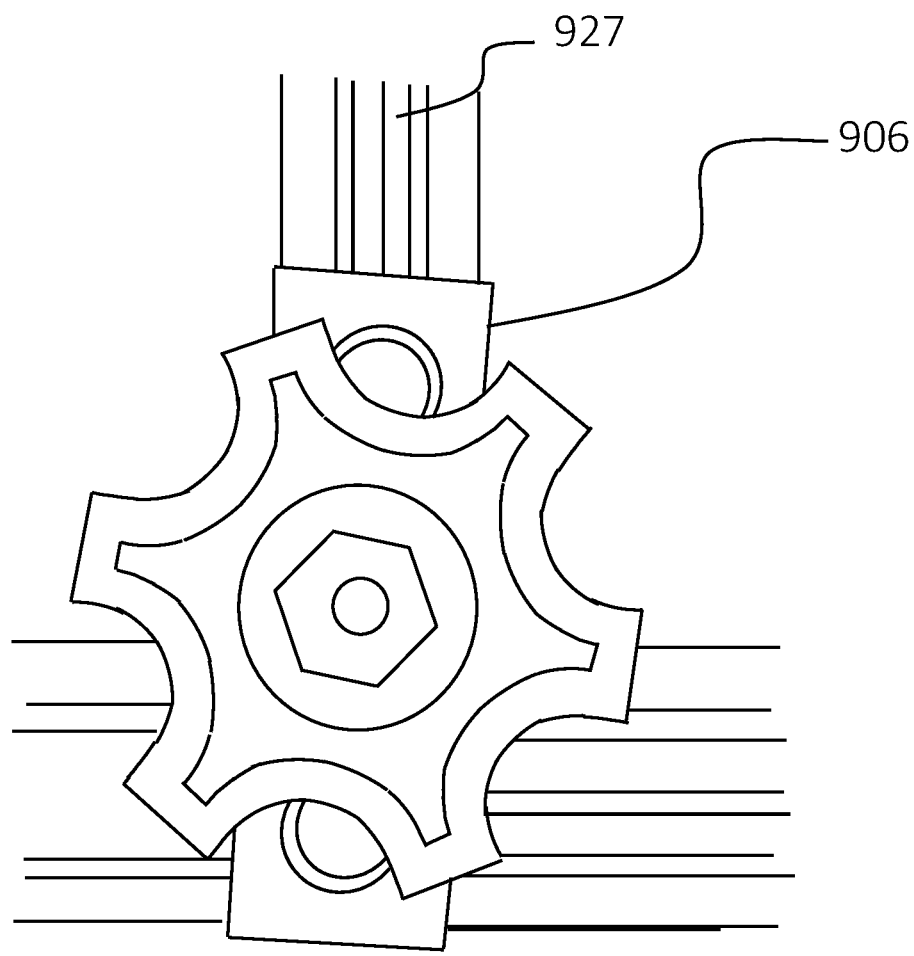
FIG. 23 shows a top view of a locking mechanism.

Further provided is an extruded view of the exemplary leveling mechanism 900 in FIG. 21. The leveling mechanism 900 shown includes base seat 906, two bolts 908a and 908b, nut 910, nut seat 912, adjuster knob 914, and long bolt 916. Turning to FIG. 22, the leveling mechanism 900 is shown in its assembled form. The base seat 906 is a generally flat, narrow, and elongated element with a plurality of openings which may be threaded. The base seat 906 rests generally flush on the frame 918. The frame 918 may comprise rails that include hollow interiors such as hollow tracks 927 shown in FIG. 23 into which the base seat 906 may be nested and slide along a track into a desired position. The variable positioning allows the leveling mechanism 900 to be versatile and to be used with a variety of different sized beds.

The frame 918 further includes frame openings to which the base seat 906 may be attached by bolts 908a and 908b. Other fastening means are contemplated. The frame openings (not shown) may be located within the hollow tracks 927. The frame openings may be slot openings, round openings, or other openings. The base seat 906 also includes openings, namely, base seat openings 907 located on opposing ends of the element. Bolts 908a and 908b go through frame openings and base seat openings 907 to secure the base seat 906 to the frame 918.

A third opening 907 on the base seat 906 allows the base seat 906 to be bolted to the bed assembly 901. The opening 907 is located anywhere along the base seat but as shown it is located at a midpoint on the element. The base seat 906 is bolted into the bed assembly 901 via the long bolt 916 through the opening 907 located at the midpoint of the element. The long bolt 916 and bed attachment 922 restricts any rotational movement of the bed assembly 901, such that the bed assembly 901 is fixed and unable to rotate relative to the long bolt 916.

The act of lifting and lowering regions of the bed assembly 901 is accomplished by a simple rotation of the adjuster knob 924. As shown in FIG. 22, the adjuster knob 924 includes a disc with a series of concave grooves formed around a periphery of the disc. Rotation may be accomplished using a finger hold or a manual tool to grip one or more of the concave grooves.

The adjuster knob 924 further includes a central nut opening 928. A nut 910 is pressed into a nut seat 912 which is pressed into the nut opening 928 of the adjuster knob 924. Between the adjuster knob 924 and the nut seat 912, the base seat 906 is locked, however, the adjuster knob 924 is free to rotate with respect to the base seat 906.

Figure 24:
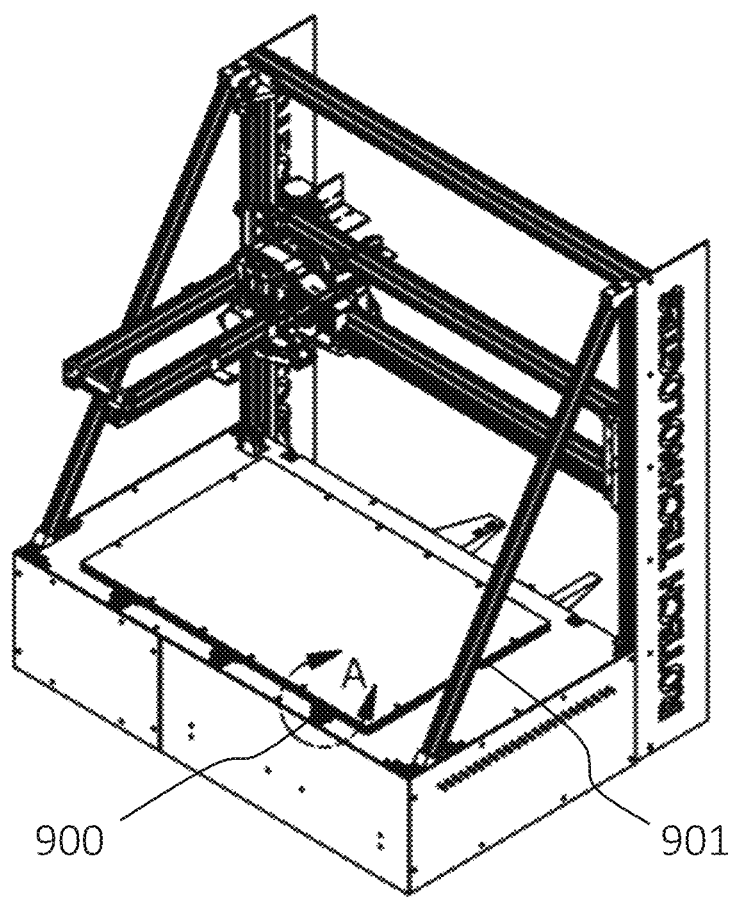
FIG. 24 shows perspective view of a 3D printer with a leveling mechanism.
Figure 25:
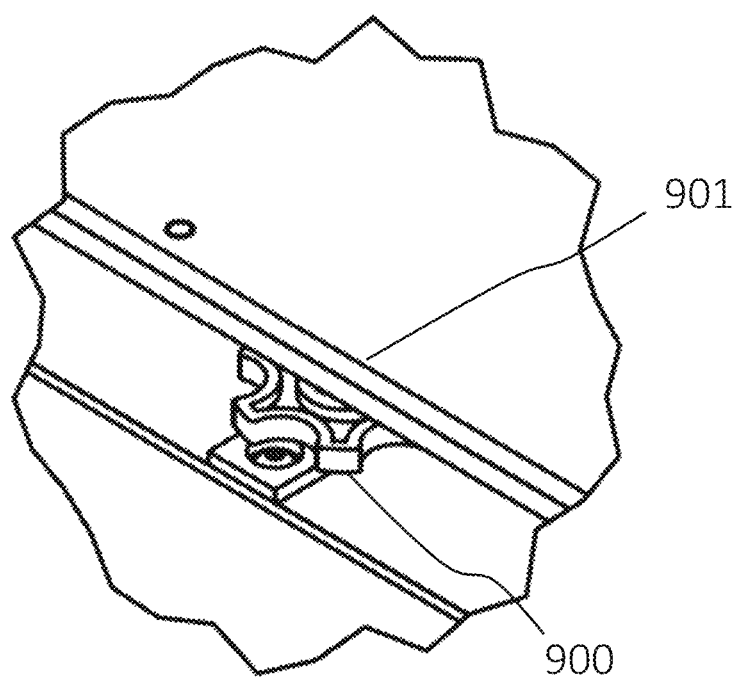
FIG. 25 shows a close-up view of a 3D printer with a leveling mechanism.
Figure 26:
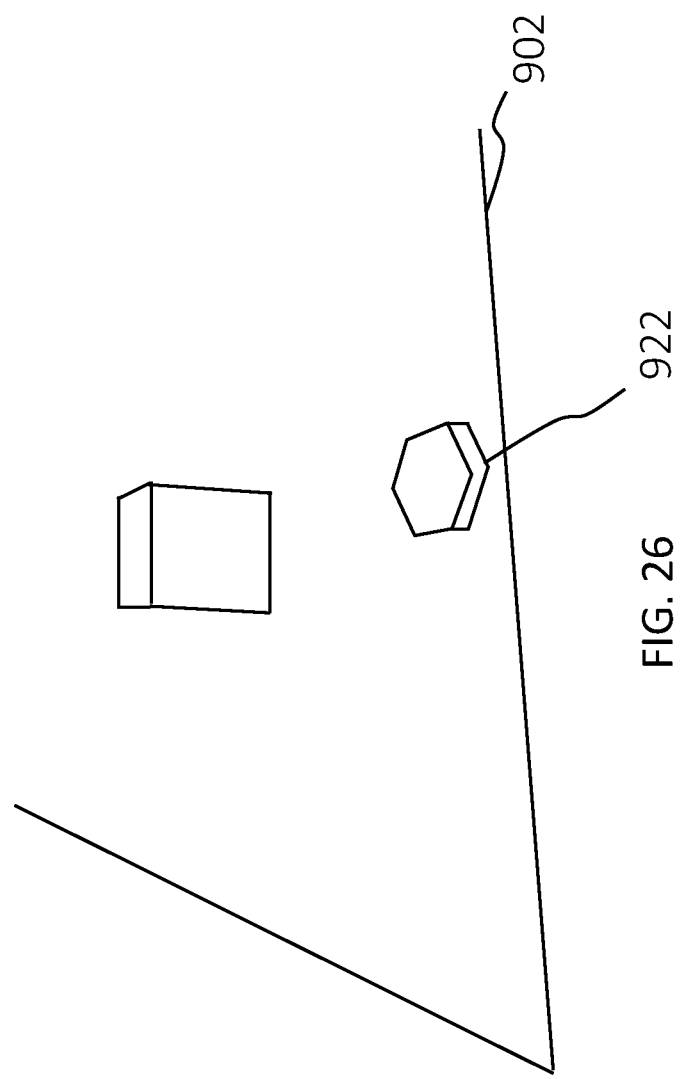
FIG. 26 shows a perspective view of a 3D printer with a locking mechanism.

To adjust the height of the bed, the user merely turns the adjuster knob 914 about its long axis. The rotation of the adjuster knob 914 rotates the nut 910 up or down the long bolt 914. Since the nut 910 and nut seat 912 are only free to rotate but not free to move up or down, the long bolt 916 is forced to move up or down depending on the respective clockwise or counterclockwise rotation of the nut 910. This in turn forces a bed corner or region resting on the long bolt 916 to move up or down with the long bolt 916. FIG. 24 illustrates the leveling mechanism 900 attached near a corner of the bed assembly 901. FIG. 25 illustrates a detail view of the leveling mechanism 900 near a corner of the bed assembly 901. FIG. 26 shows a leveling mechanism 900 attached to a top substrate 902 with an attachment piece 922 (e.g., screw, etc.).

One of the advantages of the leveling mechanism is that it can be used in conjunction with other types of bed assembly components. Possible uses with the mechanism include, among other things, use with interchangeable substrates having different sizes.

Another advantage of the mechanism is that may remain completely below the bottom substrate, taking little or no space on the top substrate. Also, the mechanism remains mostly invisible and does not detract from sides of the substrate.

Exemplary materials for the leveling mechanism include nylon, for example, a nylon threaded screw can be used in conjunction with a screw that goes through the bottom substrate. The nylon material is useful to clamp down against substrates made of glass. Other materials are also anticipated.

Locking Mechanism

A locking mechanism may be used to affix the top substrate to the bottom substrate in a tight manner. In one embodiment, the locking mechanism includes a magnetic hold to affix the substrates together. Alternatively, the locking mechanism includes a mechanical locking means.

For the magnetic hold, the locking mechanism may include two separable components, such as a slider and at least one stop. The slider slides to and from the stop to form an open configuration and a closed configuration. The open configuration allows a top substrate and a bottom substrate to be separated while the closed configuration secures the top substrate and the bottom substrate together. Instead of a stop, the slider may not have any stops or fixed points of rest. Instead, the slider may move and freely halt in the open and closed positions. In another variation, a stop may be an area with increased friction on a surface or other means of preventing movement.

Figure 27B:
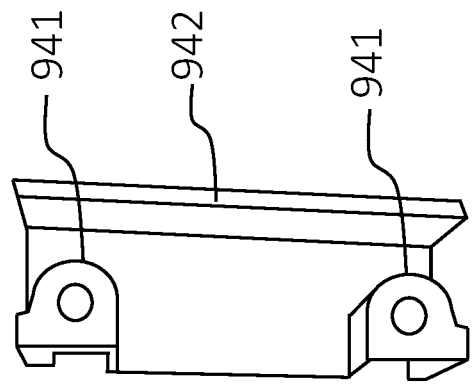
FIG. 27b shows a top view of a component of a locking mechanism.
Figure 27A:
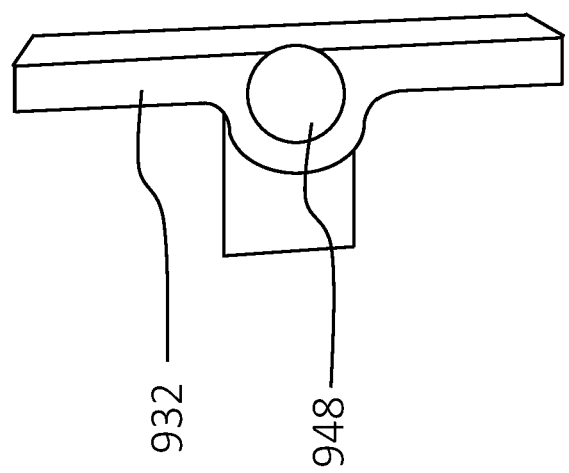
FIG. 27a shows a top view of a component of a locking mechanism.
Figure 28:
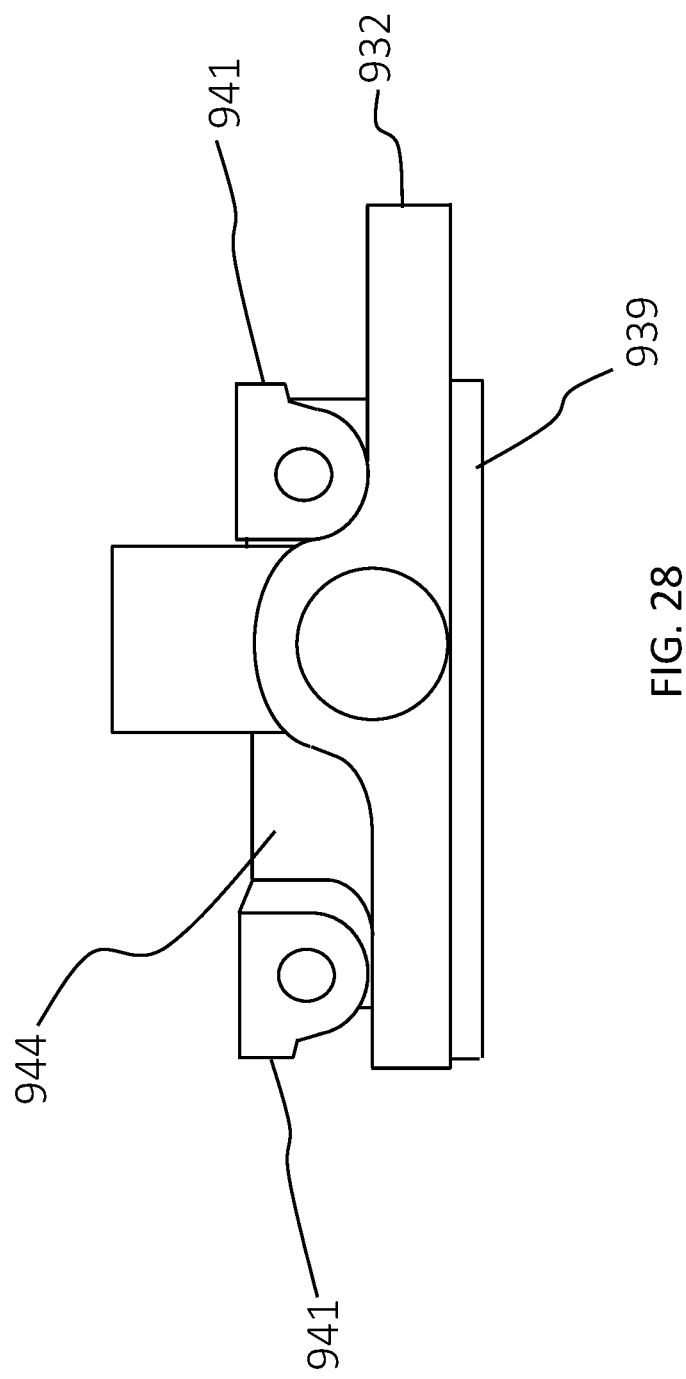
FIG. 28 shows a top view of a locking mechanism.
Figure 29:
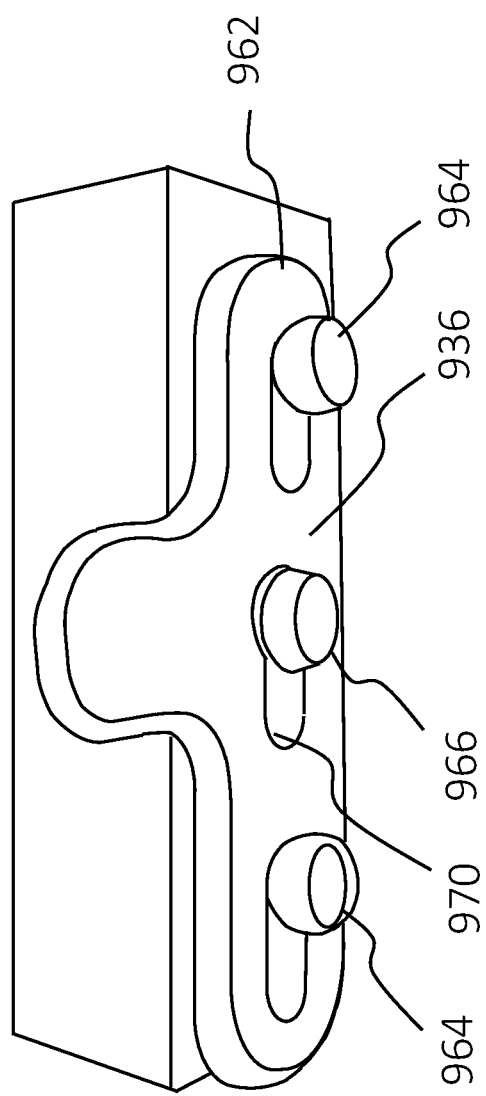
FIG. 29 shows a perspective view of a locking mechanism.
Figure 30:
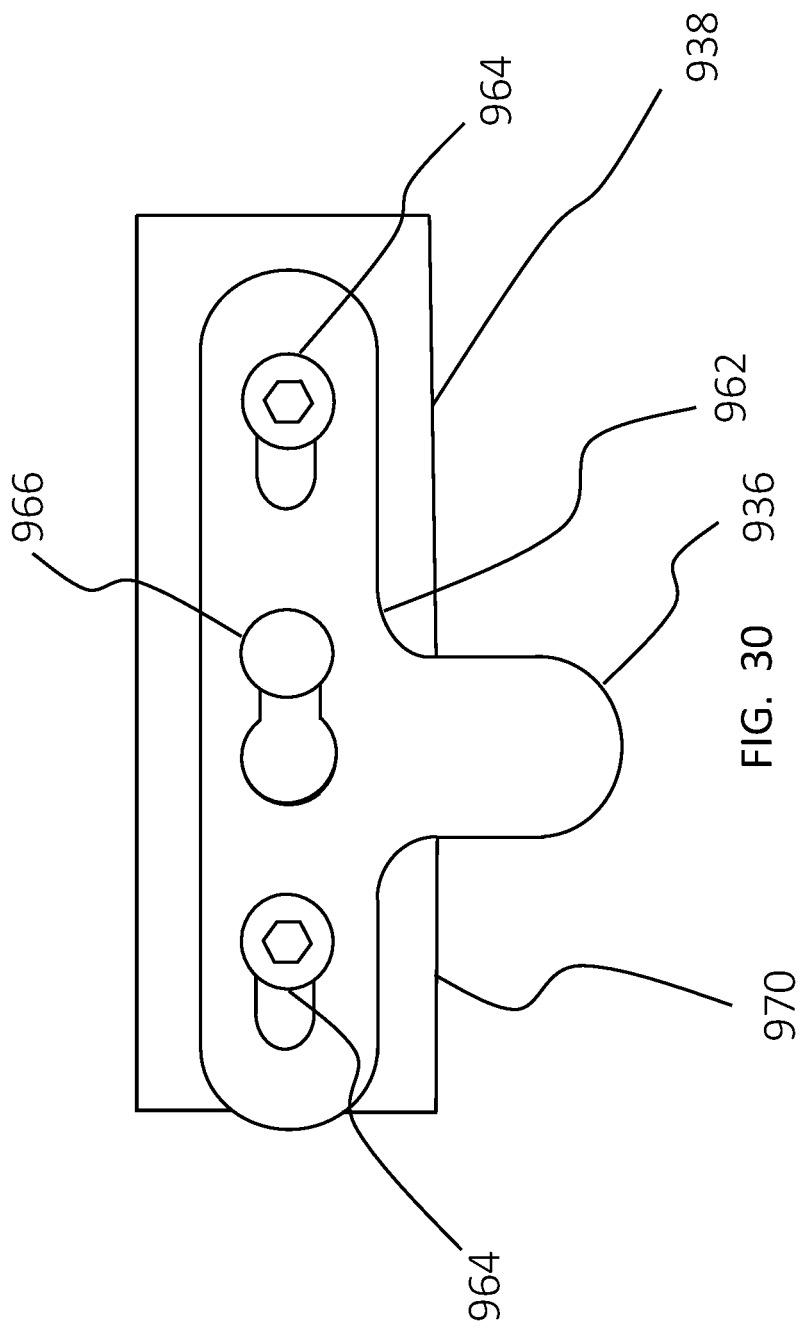
FIG. 30 shows a top view of a component for a mechanical locking mechanism.
Figure 31:
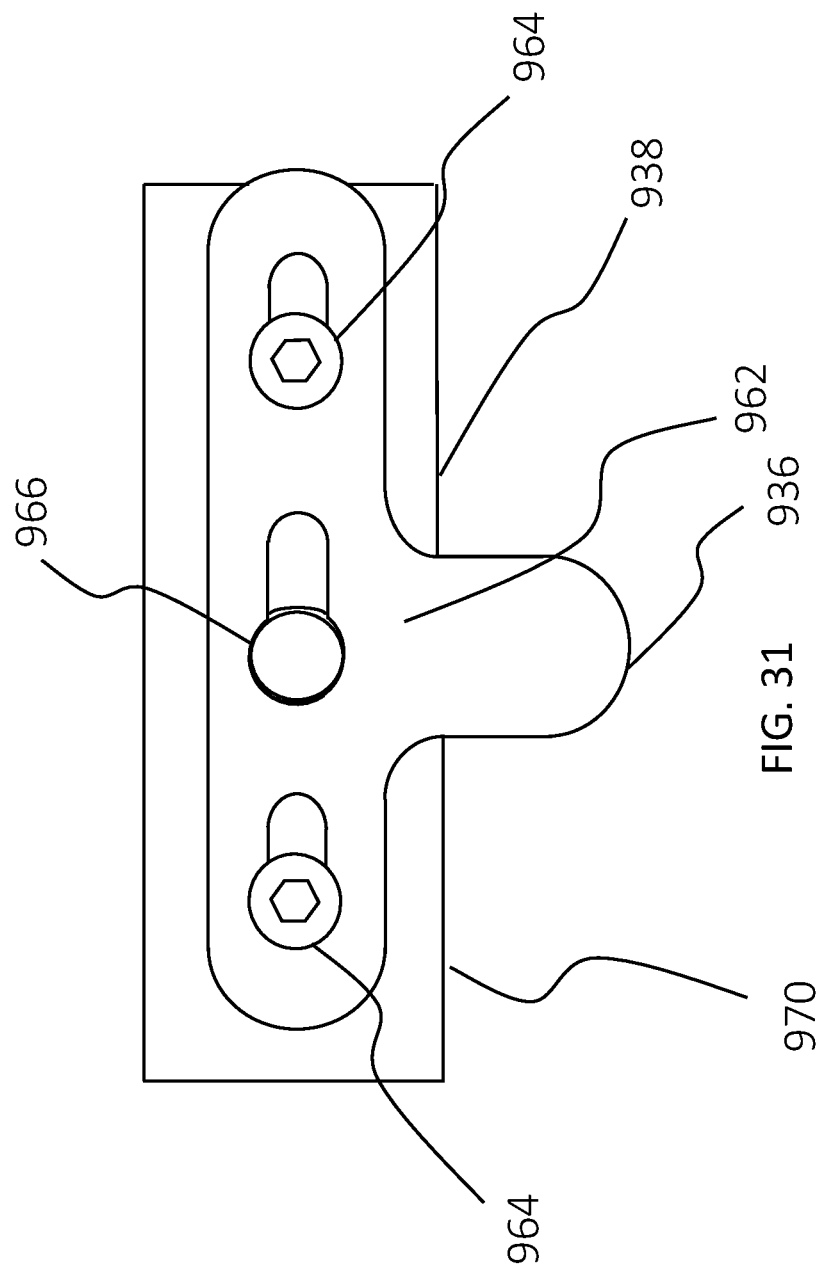
FIG. 31 shows a top view of a component for a mechanical locking mechanism.
Figure 32A:
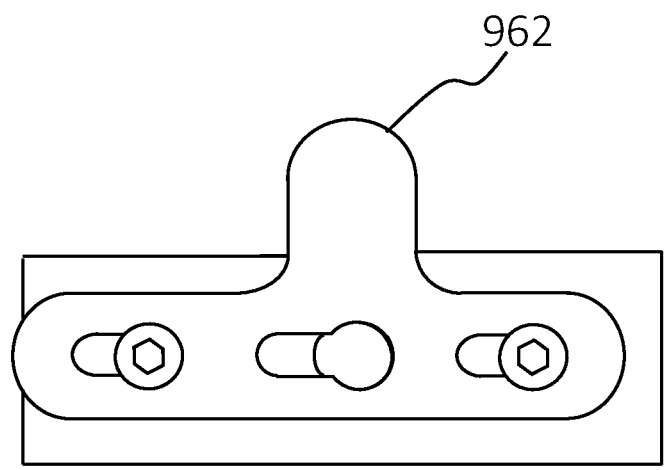
FIG. 32a shows a side view of a component for a mechanical locking mechanism.
Figure 32B:
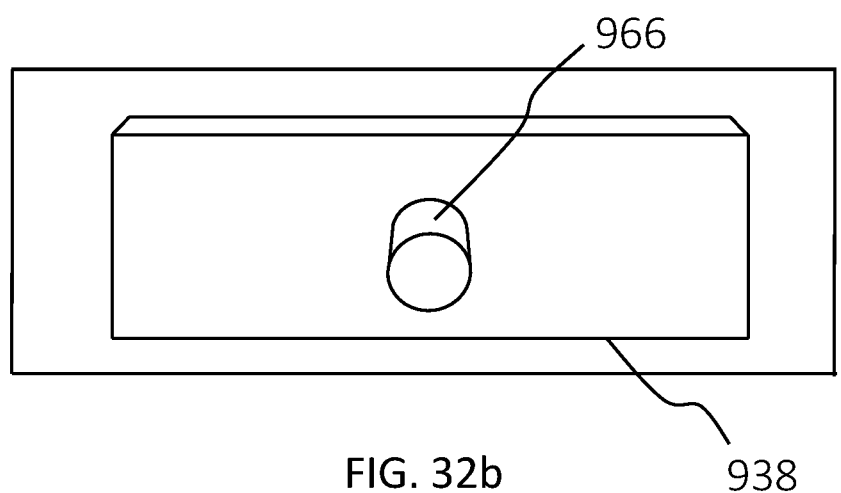
FIG. 32b shows a side view of a component for a mechanical locking mechanism.
Figure 33A:
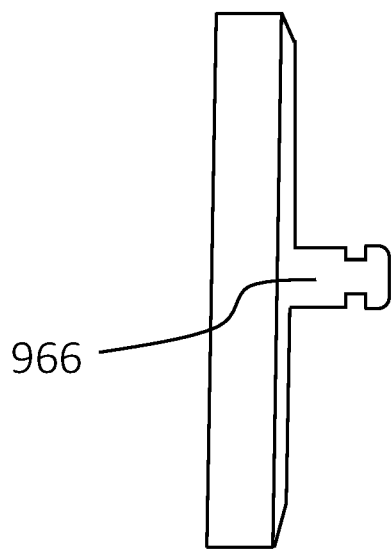
FIG. 33a shows a side view of a component for mechanical locking mechanism.
Figure 33B:
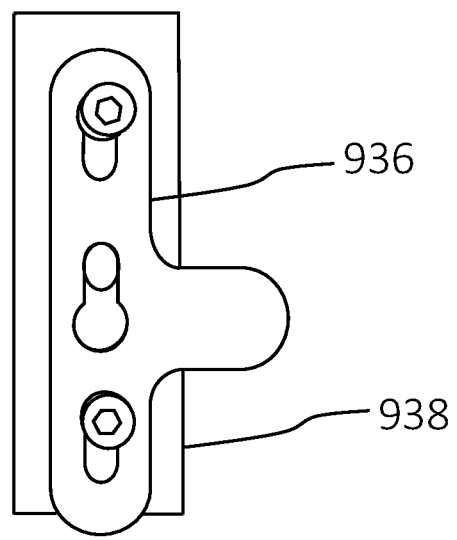
FIG. 33b shows a bottom view of a mechanical locking mechanism.
Figures 34A, 34B:
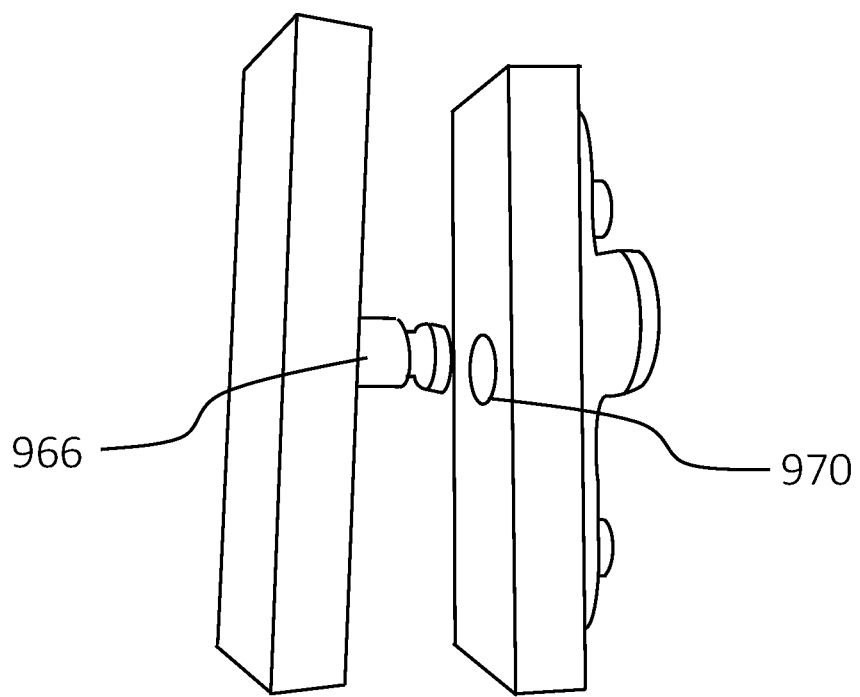
FIG. 34a shows a side view of a component of a mechanical locking mechanism.
FIG. 34b shows a side view of a component of a mechanical locking mechanism.

The locking mechanism may include a flat plate on which the slider slides. Additionally, the locking mechanism may incorporate magnetization to hold the two substrates together. For example, an exemplary locking mechanism 930 with magnetization is shown in FIGS. 27a and 27b. The locking mechanism 930 includes a holder 942, a slider 932, one or more magnets 948, and fasteners 950 (e.g., screws, etc.). The holder 942 includes a flat plate 944 with a perpendicular sidewall 939, the plate 940 and sidewall 939 forming two convergent lateral walls. The plate 940 further includes at least one stop 941. As shown in FIGS. 27b and 28, two stops 941 are spaced apart from each other, with one stop positioned on either end of the plate. The stops 941 are also spaced a width apart from the sidewall 939 so as to provide a boundary which allows the slider 932 to slide lengthwise along the plate 940 from one stop to the other stop.

The holder 946 is attached to a lower substrate 938 of the printer 901 or the frame 918 of the printer 901 via fasteners 950. The fasteners 950 are inserted through holes that extend therethrough the stops 941.

The slider 932 includes an element that has two perpendicular arms 954 that form a T-shape. As shown, one of the arms 954 is a slider arm that is elongated and is longer than the other arm, the other arm being a control arm. Lengths may vary, with the control having a longer arm, or the arms that cross the T having same or different lengths. At the juncture between the arms (i.e., at the center of the top of the T-shape), a first magnet 948 is attached. The magnet 948 may be exposed or lodged within the slider so as to be covered. A corresponding second magnet 948 is attached to or otherwise configured with respect to least one of the substrates.

The slider 932, stops 934, and sidewall 939 may have similar heights so as to be generally flush with the underside of a substrate 938. Alternatively, the slider 932 may have a shorter height to allow sufficient clearance while sliding and avoid direct contact with the substrate 938, which is generally hot while in use.

To assemble the locking mechanism 930, the slider 932 is placed on the plate 940 so that the long arm is slidably located between the stops 934 and the sidewall 939. The short arm extends away from the sidewall 939, the short arm being slidably located between the stops 934. The short arm extends beyond the width of the plate 940, creating a visible finger hold for which a user may manually slide the slider side to side between the two stops 941 to create movement between an open position in which the magnets 948 are not aligned and a closed position in which the magnets 948 are aligned. Other types of manual controls may be used. The aligned position serves to tightly hold the top substrate 936 to the bottom substrate 938. The unaligned position serves to create an open space that no longer has a magnetic connection. The unaligned position removes any force that would hold the top substrate 936 to the bottom substrate 938.

For use, the open position allows the two substrates to be moved relative to each other. For example, a hot substrate could be replaced with a cooler substrate. At the closed position, the magnetic attraction of the magnets holds the two substrates together and thereby restricts any movement.

A plurality of locking mechanisms may be used at or near outer edges around the bottom substrate to create a plurality of locations that provide a secure hold of the substrates.

Instead of using magnetization, a mechanical locking feature may be used. An exemplary mechanical locking mechanism 960 is shown in FIGS. 29, 30, 31, 32a, 32b, 33a, 33b, 34a, and 34b. The locking mechanism 960 includes a slider 962 and at least one stop 964. The slider 962 is a generally flat T-shape that slides to and from the stop 964 to form an open configuration and a closed configuration, as described previously. The stops are the screws that attach the slider to the underside of bottom substrate. Other types of stops may be used as well.

An extension element 966 may extend from the top substrate 936. The slider 962 may include an elongated slot 970 having a rounded opening (e.g., circular, oval, oblong, etc.) with a diameter that is larger than the slot 970. The slider 962 slides relative to the extension element 966 inserted in the slot 970, the open configuration including the extension element in the opening and the closed configuration including the extension element slot outside the opening.

An annular notch 968 is located around the extension element 966. A base portion 972 is defined by the region located below the notch 968. As shown, the extension element 966 is an elongated cylinder and the notch 968 is distally located on the cylinder. The extension element 966 is attached (e.g., screw, bond, friction fit, etc.) to the top substrate 936 and allows the slider 962 to lock and unlock the substrates from the printer frame 918. When locked, the extension element 966 is not within the opening. When unlocked, the slider 962 moves to the opposing stop 964 and the extension element 966 is within the opening. In the unlocked position, the slider 962 may be disengaged from the extension element 966 and the top substrate 936.

The slider 962 may be attached to the bottom substrate 938 by known means of attachments, such as screws that are shown.

Instead of a notched element, a spring-loaded element may be used. Other mechanical means may be used as well.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A hot end configuration, comprising:
a heat sink;
a nozzle;
a barrel having a first threaded portion that is removably attached to the heat sink and a second threaded portion that is removably attached to the nozzle to form an independent assembly of the heat sink, nozzle, and barrel;
a heater block having an opening with a smooth interior wall that is configured to slide around the nozzle of the independent assembly to allow attachment or removal of the independent assembly by sliding the nozzle in or out of the interior wall of the heater block;
a locking structure to secure the nozzle of the independent assembly to the heater block.

2. The hot end configuration of claim 1, the barrel further comprising a smooth elongated end section that extends from the first threaded portion and that is configured to be inserted within an interior space provided within the heat sink so as to provide a second heat sink.

3. The hot end configuration of claim 2, wherein the smooth elongated end section and the interior space of the heat sink is dimensioned so that an annular space is present with no contact.

4. The hot end configuration of claim 1, wherein the nozzle is coated with nickel.

\* \* \* \* \*